Figure 1D:
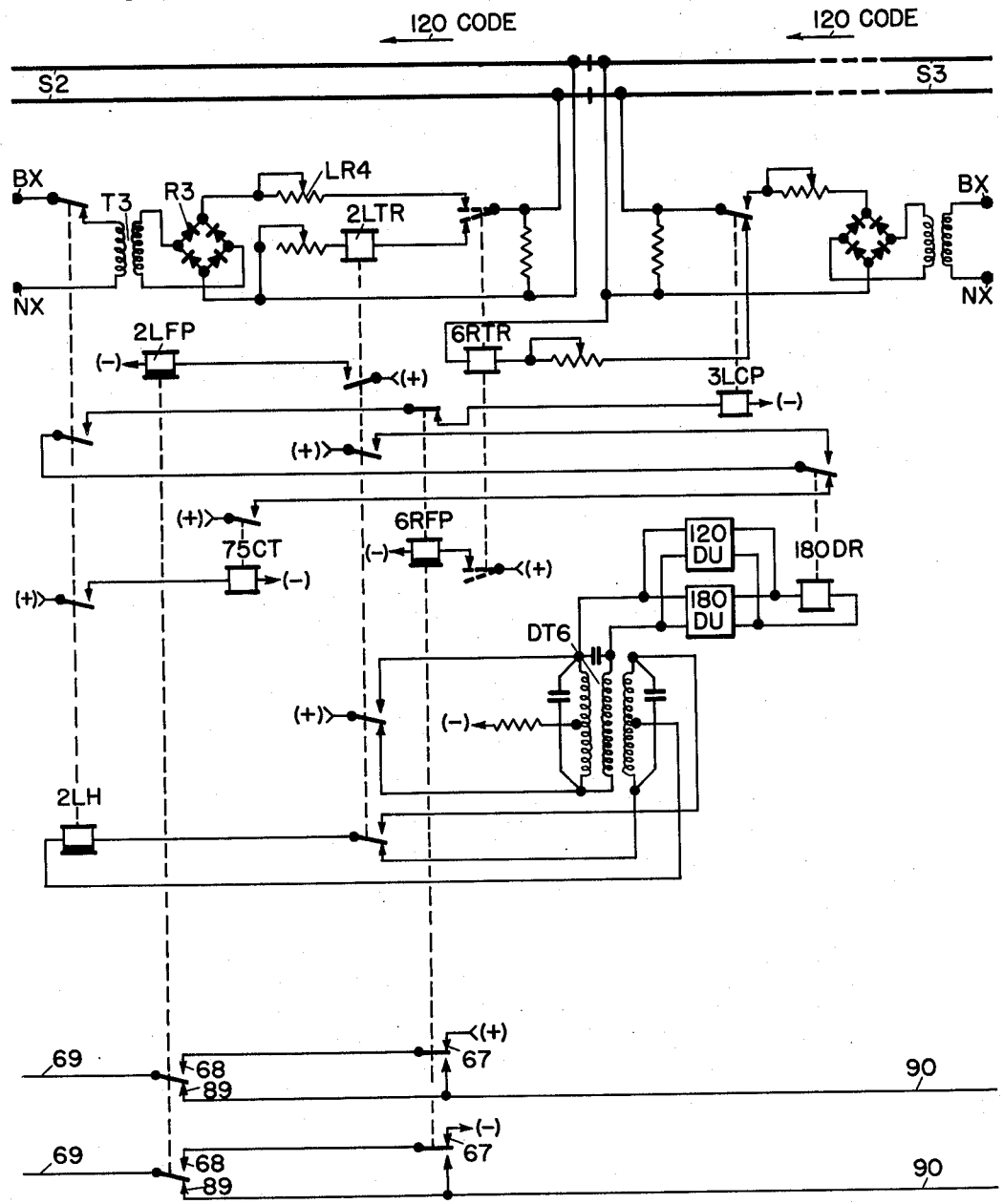

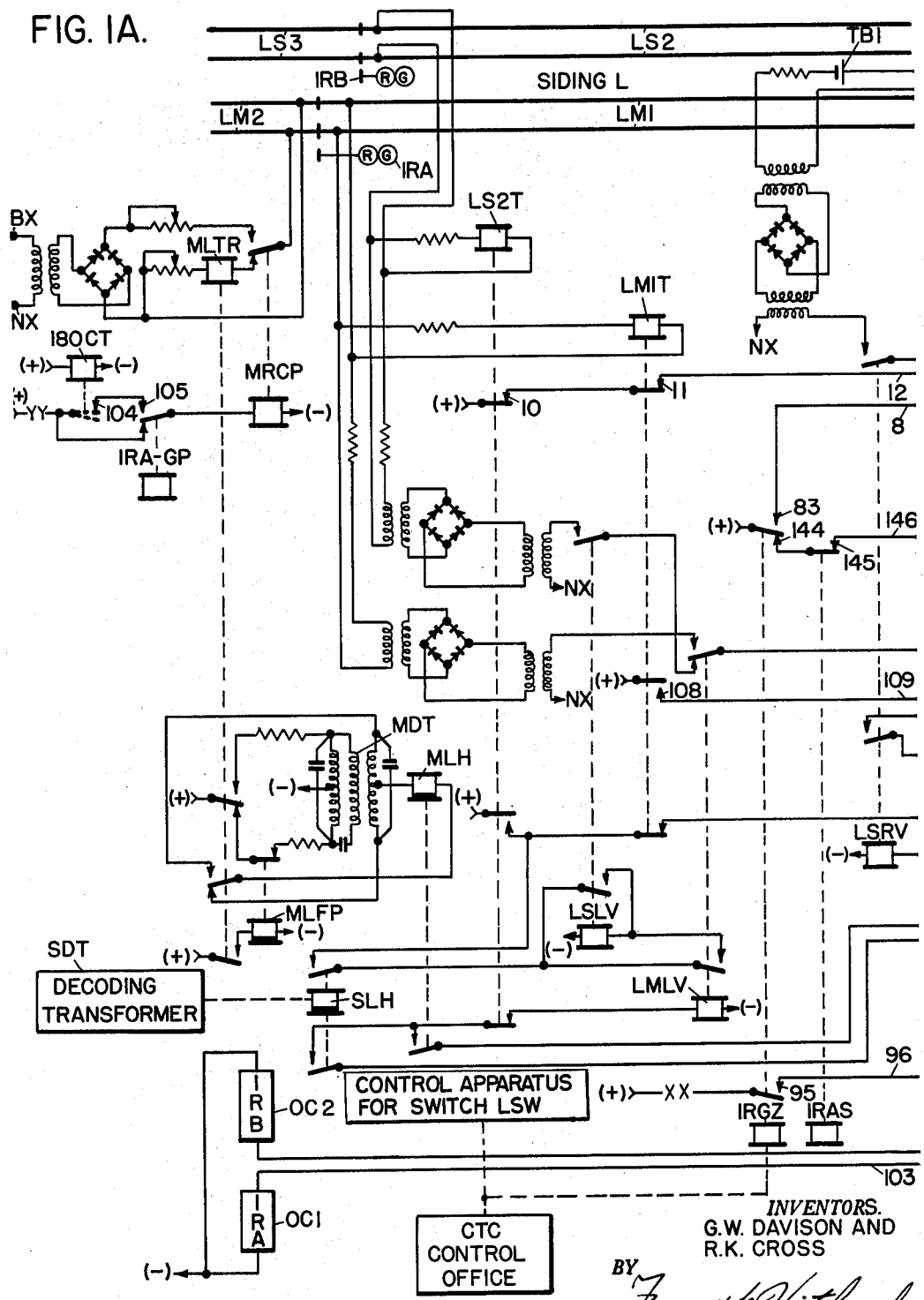
FIG. IA.
INVENTORS.
G.W. DAVISON AND
R.K. CROSS
BY
THEIR ATTORNEY

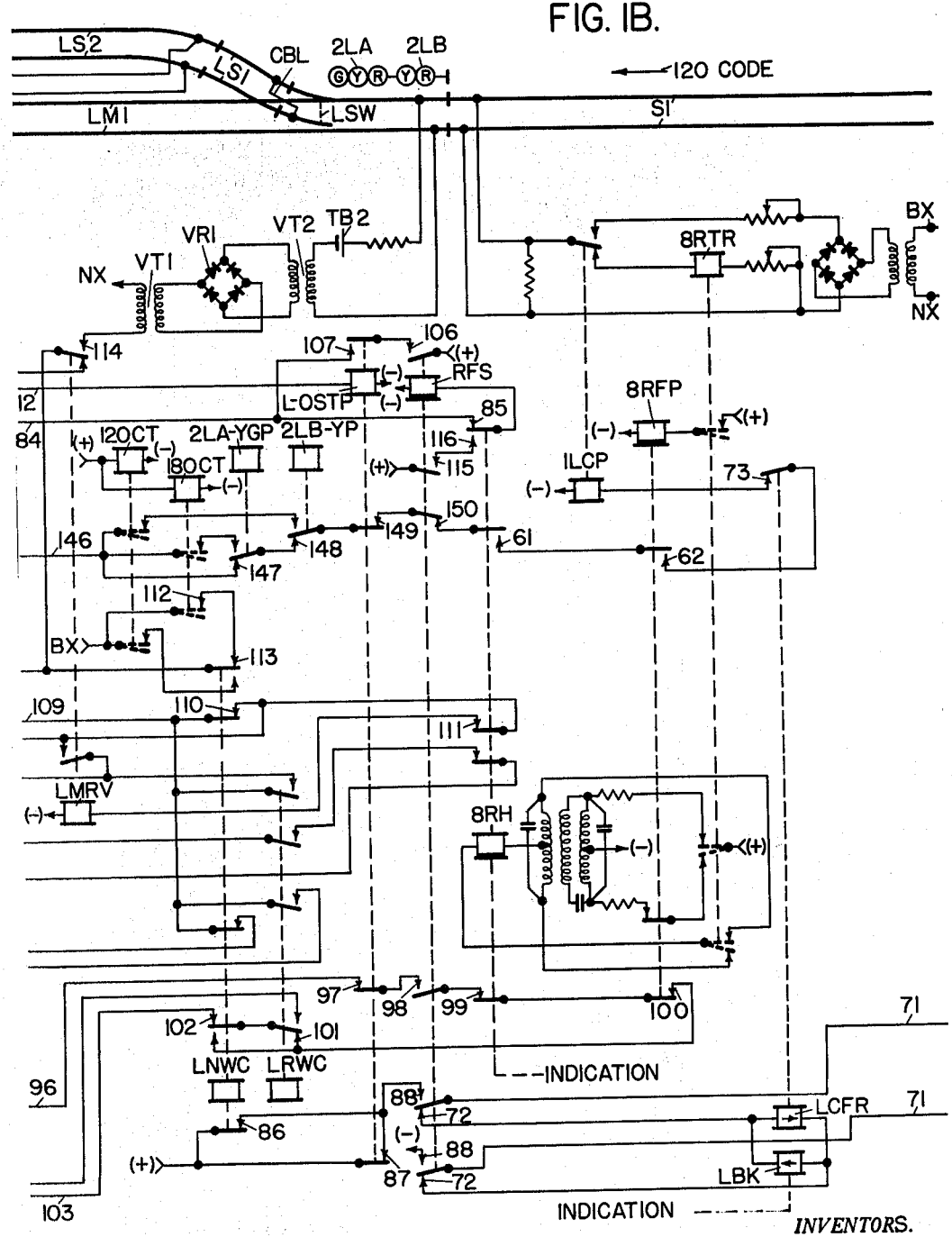
FIG. IB.
INVENTORS.
G.W. DAVISON AND
R.K. CROSS
THEIR ATTORNEY

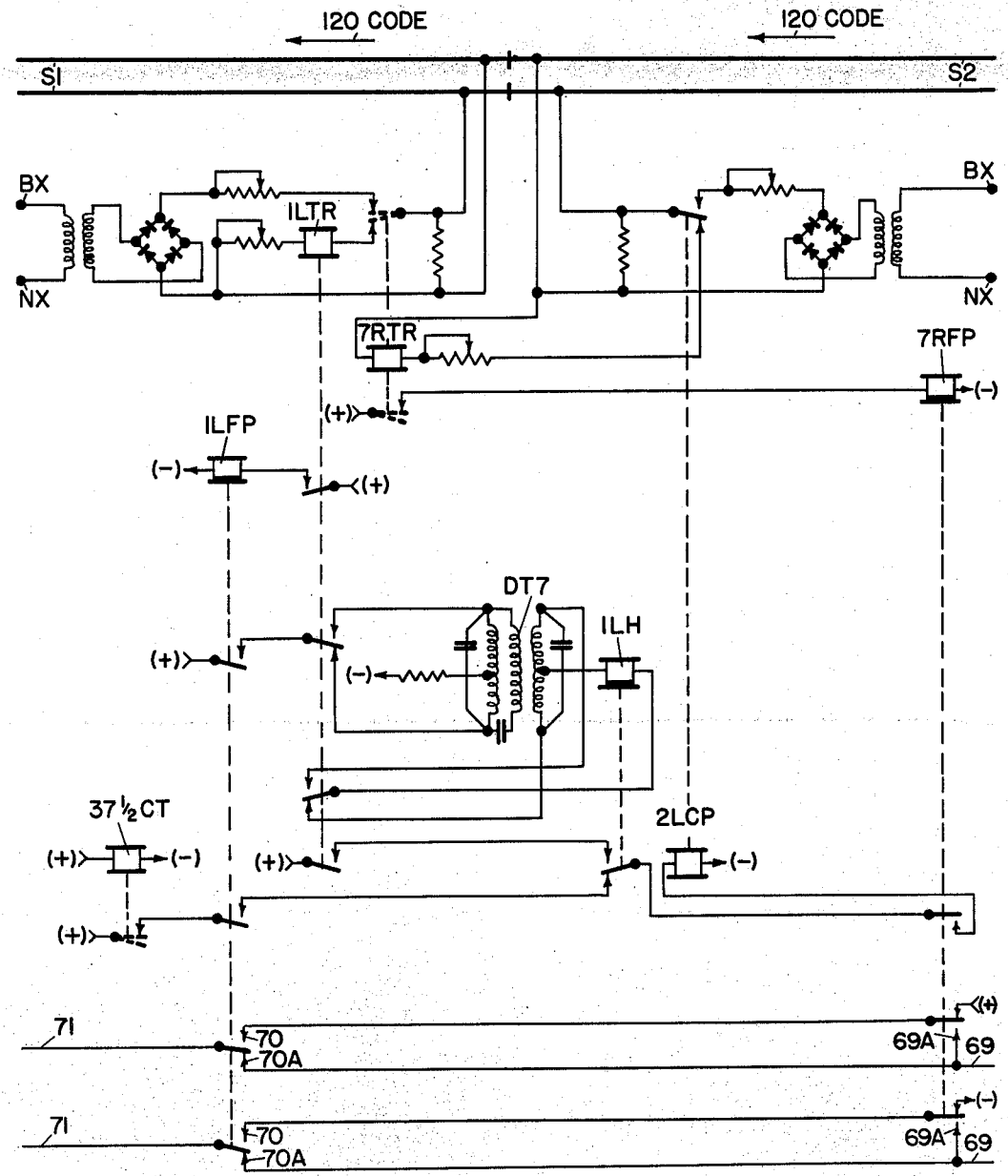

July 12, 1966 G. W. DAVISON ETAL 3,260,842
REMOTE CONTROL SYSTEM FOR RAILWAY VEHICLES
Original Filed Dec. 9, 1960 14 Sheets-Sheet 4

INVENTORS.
G.W. DAVISON AND
R.K. CROSS
BY
*Forest B. Hitchcock*
THEIR ATTORNEY

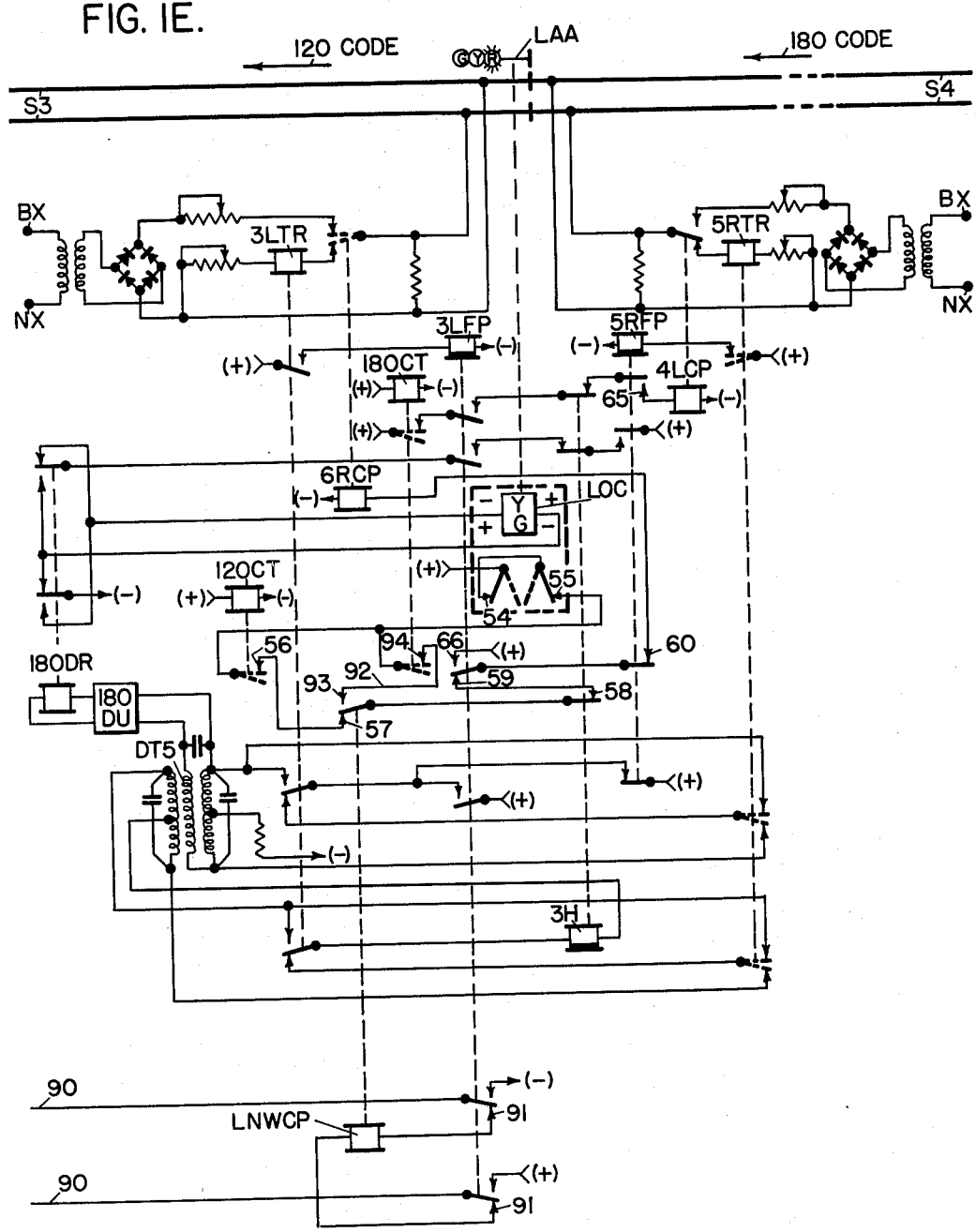

July 12, 1966  G. W. DAVISON ET AL  3,260,842
REMOTE CONTROL SYSTEM FOR RAILWAY VEHICLES
Original Filed Dec. 9, 1960  14 Sheets-Sheet 6
FIG. IF.
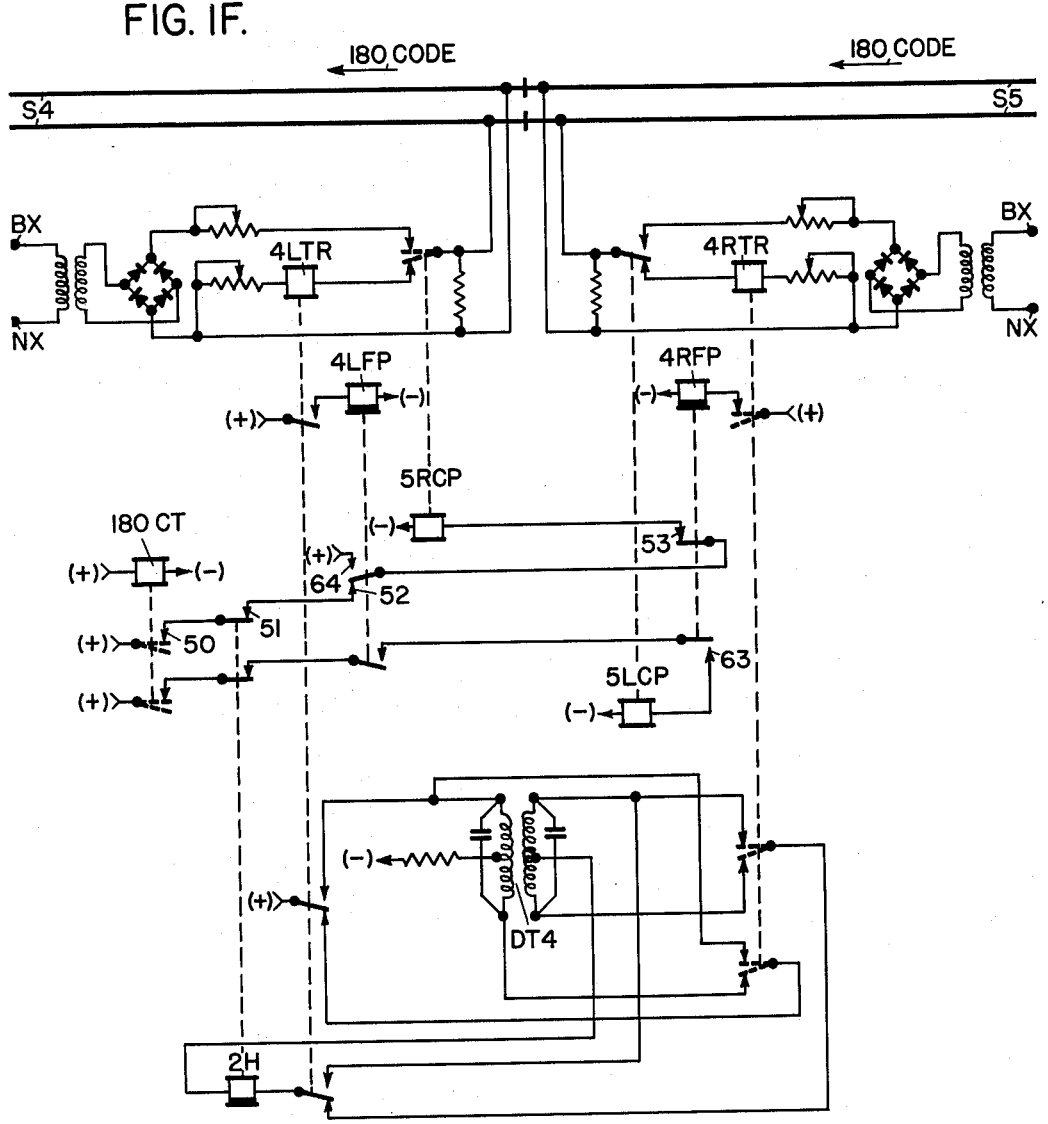
INVENTORS.
G.W. DAVISON AND
R.K. CROSS
BY
THEIR ATTORNEY July 12, 1966    G. W. DAVISON ETAL    3,260,842
REMOTE CONTROL SYSTEM FOR RAILWAY VEHICLES
Original Filed Dec. 9, 1960    14 Sheets-Sheet 7
FIG. IG.
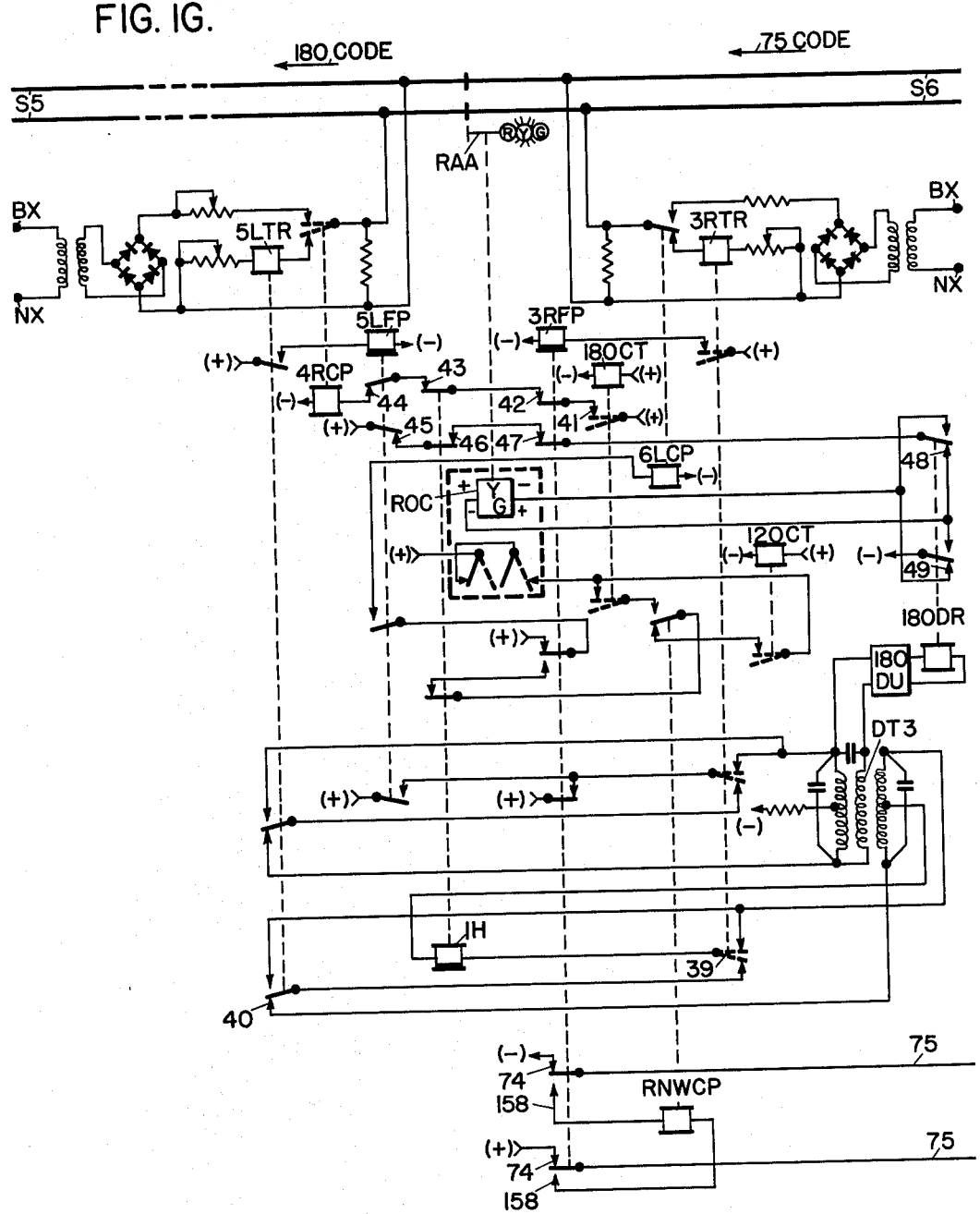
INVENTORS.
G.W. DAVISON AND
R.K. CROSS
BY
Forest B Hitchcock
THEIR ATTORNEY July 12, 1966   G. W. DAVISON ETAL   3,260,842
REMOTE CONTROL SYSTEM FOR RAILWAY VEHICLES
Original Filed Dec. 9, 1960   14 Sheets-Sheet 8
FIG. IH.
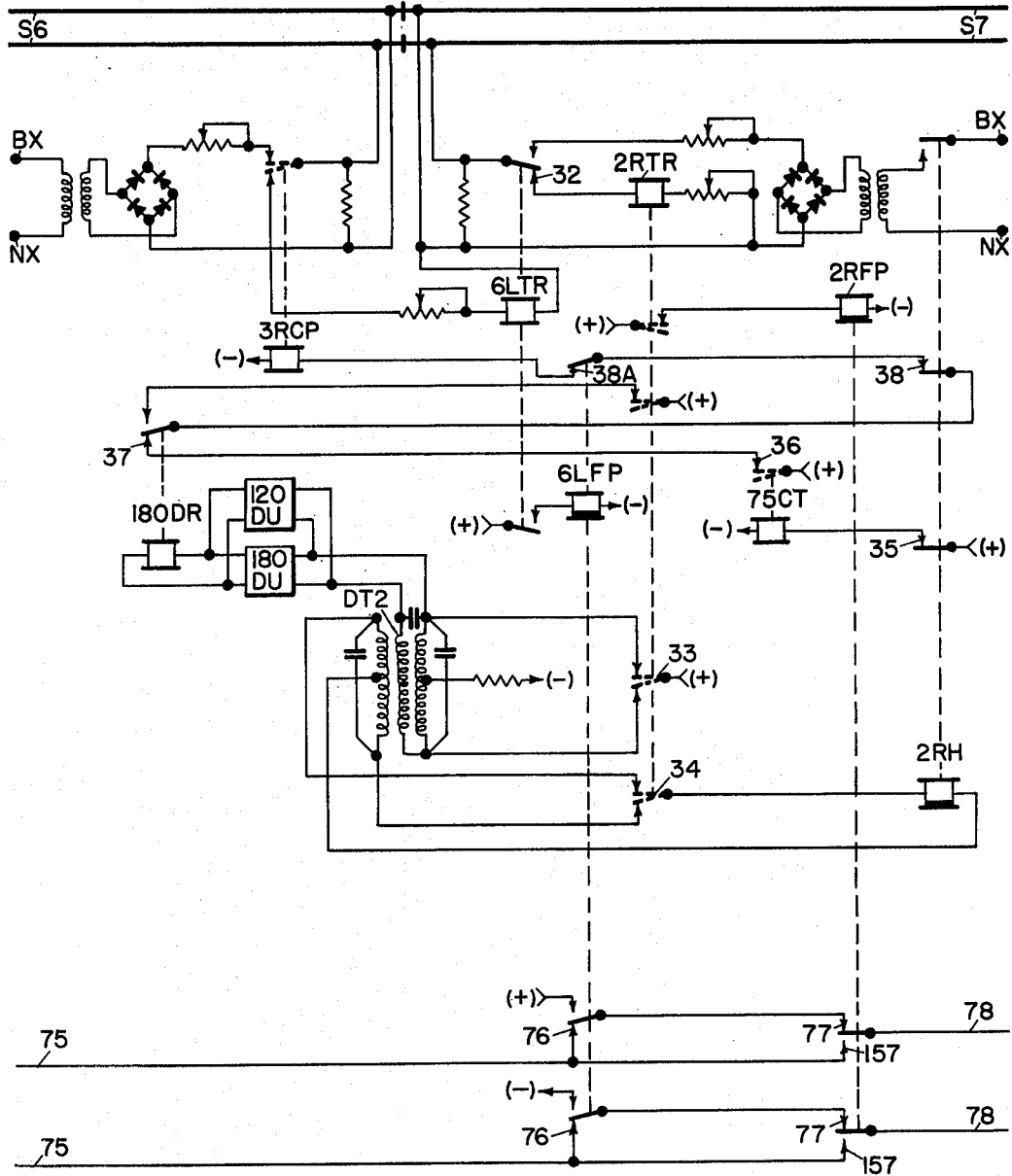
INVENTORS.
G.W. DAVISON AND
R.K. CROSS
BY
*Forest B. Hitchcock*
THEIR ATTORNEY

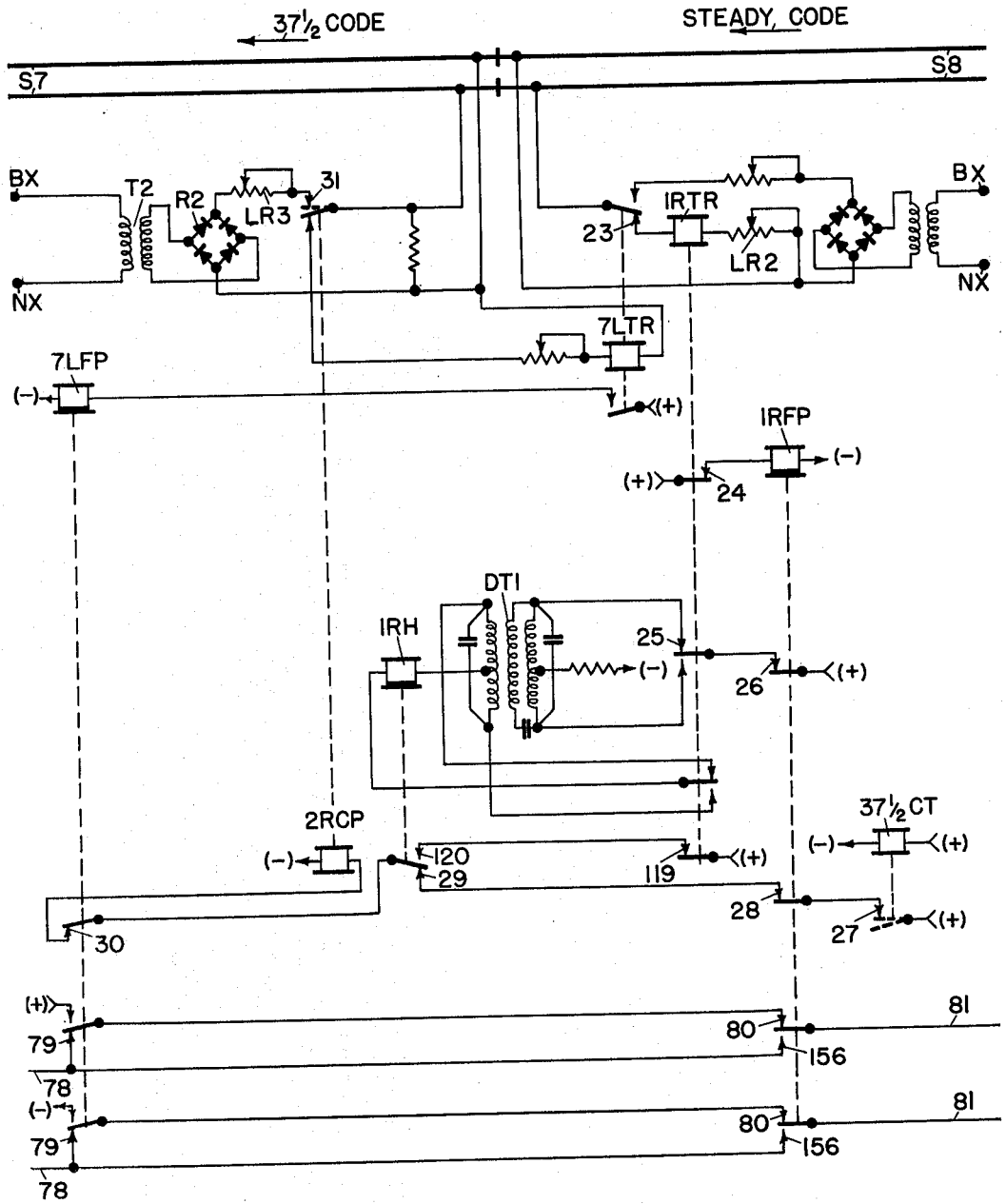

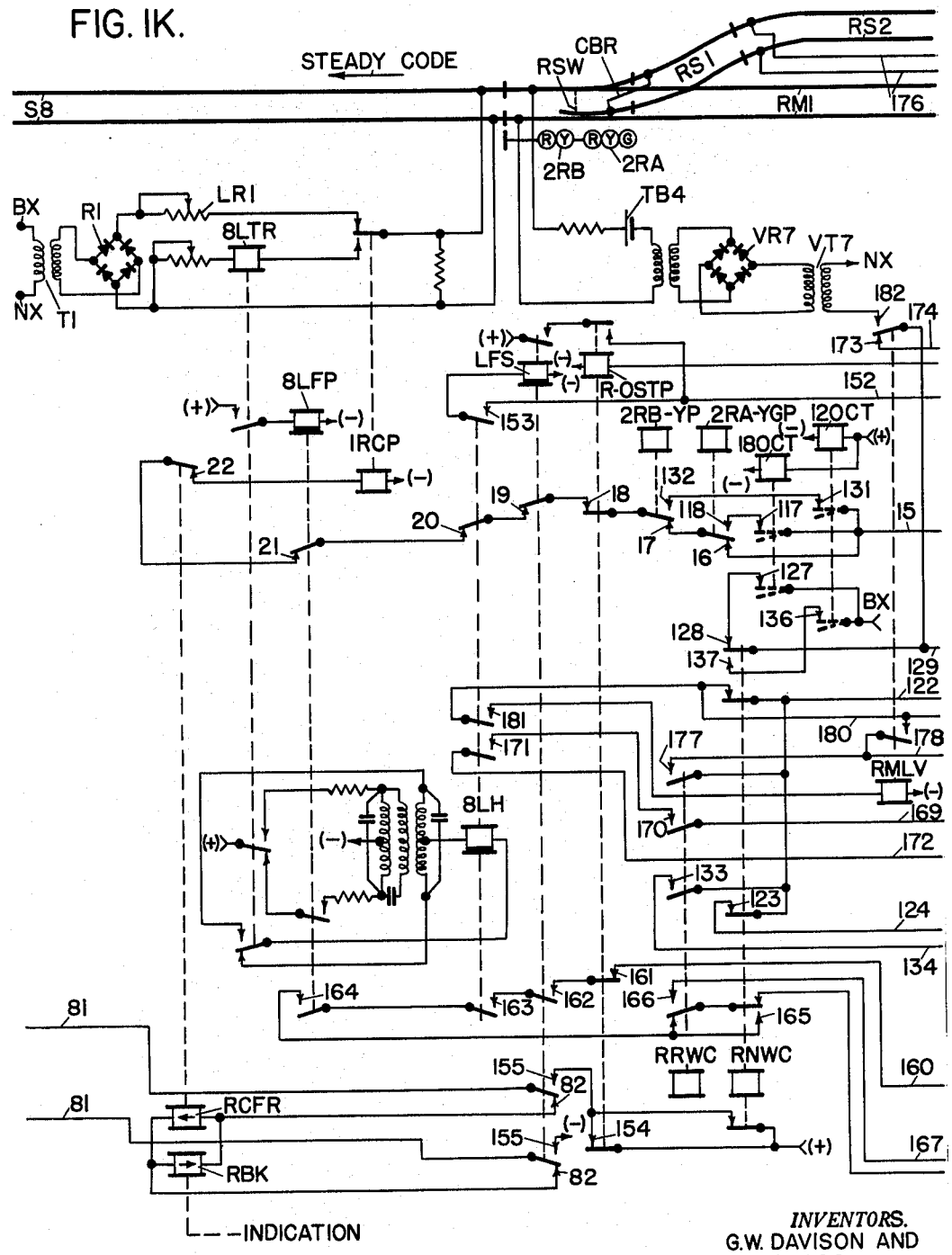

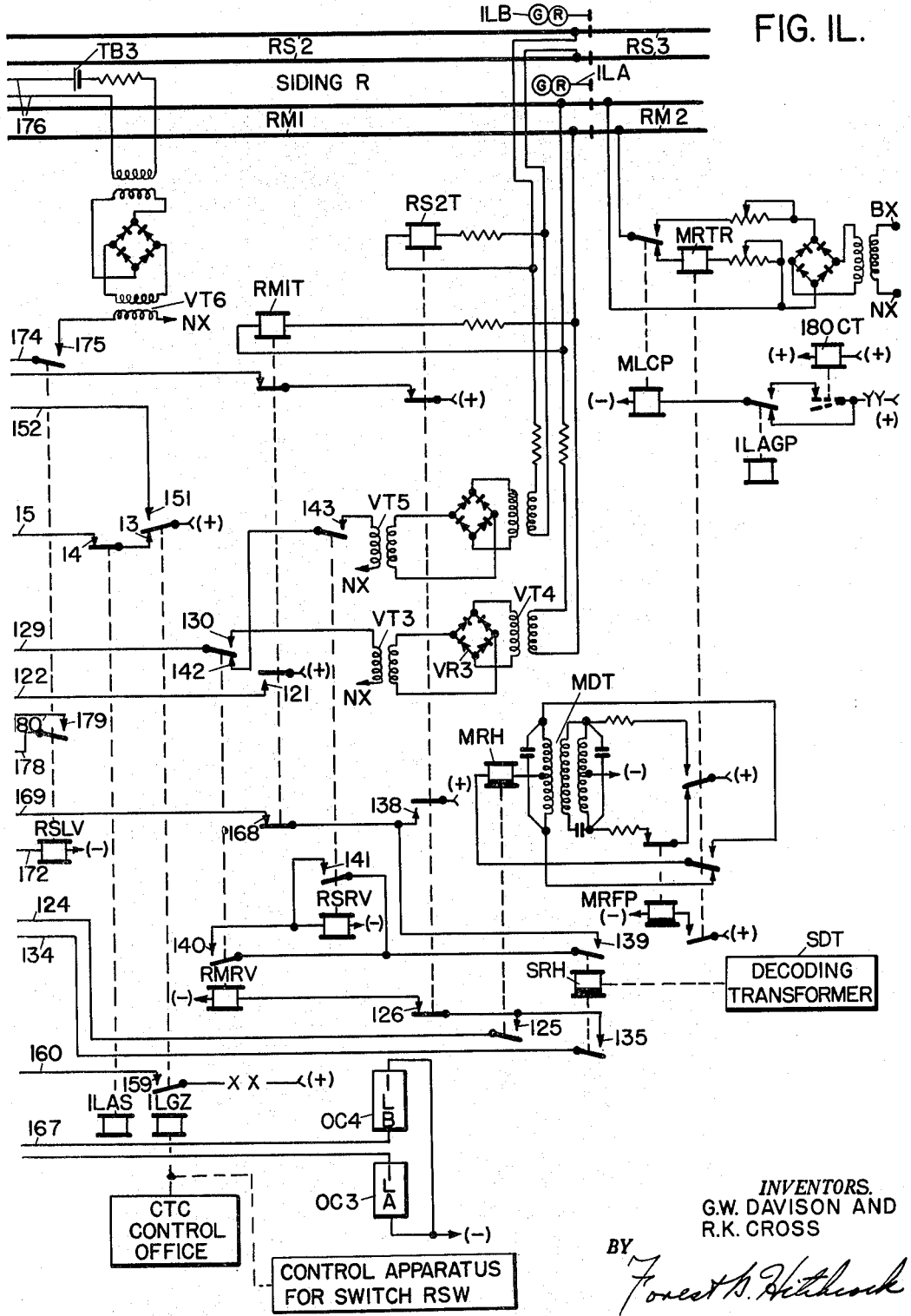

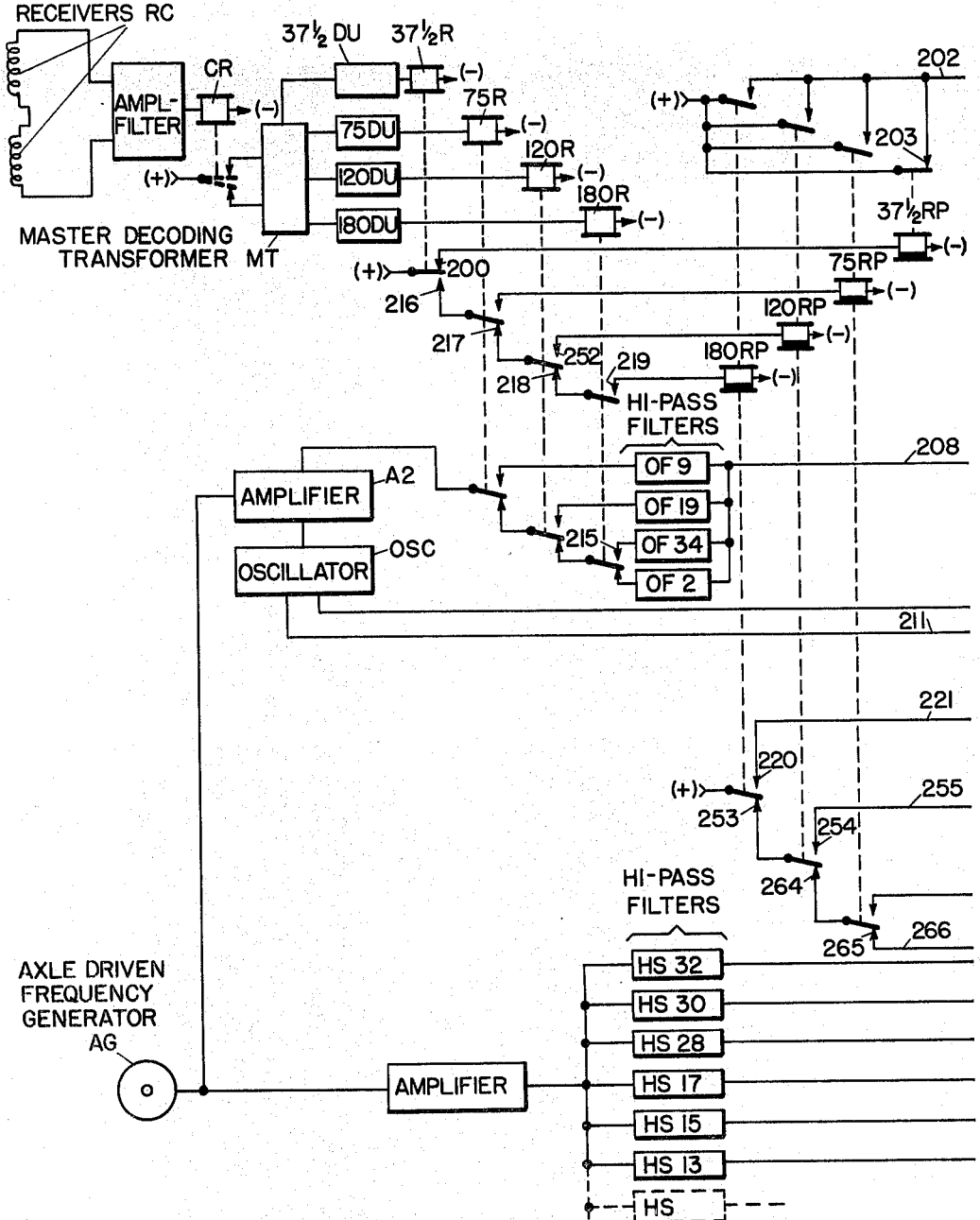

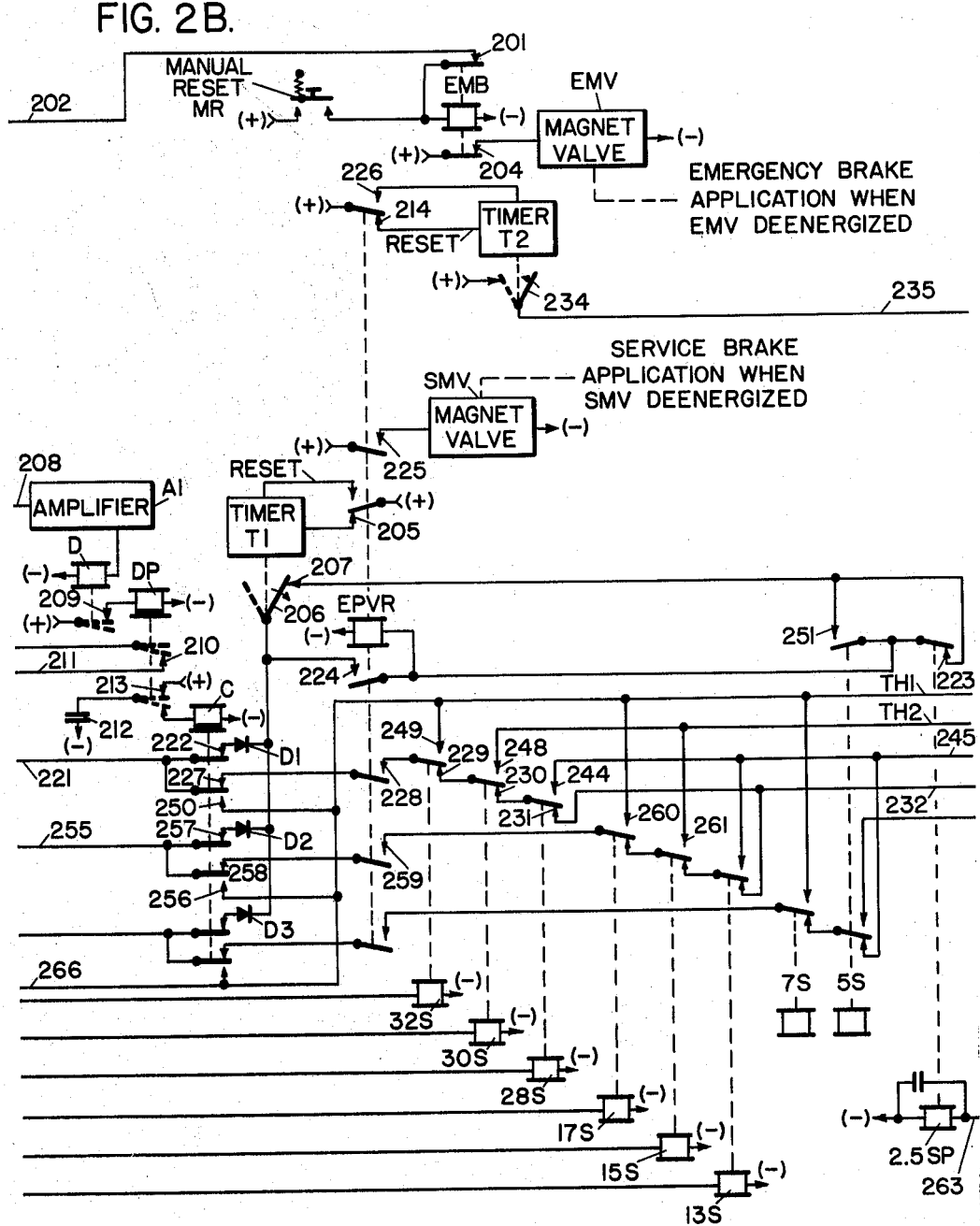

July 12, 1966  G. W. DAVISON ETAL  3,260,842
REMOTE CONTROL SYSTEM FOR RAILWAY VEHICLES
Original Filed Dec. 9, 1960  14 Sheets-Sheet 14

INVENTORS.
G.W. DAVISON AND
R.K. CROSS
BY
THEIR ATTORNEY

United States Patent Office 3,260,842
Patented July 12, 1966

3,260,842
REMOTE CONTROL SYSTEM FOR RAILWAY
VEHICLES
Gordon W. Davison, Rochester, and Robert K. Cross, Spencerport, N.Y., assignors to General Signal Corporation, a corporation of New York
Continuation of application Ser. No. 74,821, Dec. 9, 1960.
This application May 6, 1965, Ser. No. 454,248
22 Claims. (Cl. 246—4)

This application is a continuation of our prior application Ser. No. 74,821, filed December 9, 1960, now abandoned.

This invention generally relates to remote control systems for railway vehicles and more particularly pertains to remote control systems for governing the operation of railway vehicles, in two directions, on a stretch of single track between two control locations.

In many previously proposed systems, coded track circuits have been employed in a centralized traffic control system, commonly known as CTC, for controlling wayside and/or cab signals as well as indication and/or enforcement of maximum permissive speed limits for train moves over a stretch of single track between control locations, such as the CTC field locations. In such previous systems, the CTC system was utilized to provide switch control as well as signal clearing control in accordance with the desired train moves over the stretch of track.

It is generally proposed, in the present invention, to utilize coded track circuits for controlling the operation of unmanned railway vehicles on such a stretch of single track between control locations; i.e. actual control of the throttle and brake apparatus of railway vehicles in accordance with distinctive track codes transmitted to the vehicles, via the track rails, regarding the conditions in advance of the vehicles. In the illustrated embodiment of the present invention, the unmanned vehicles being controlled are provided with automation equipment for automatically operating the vehicle throttle and brakes which is substantially the same as that disclosed in the copending application of J. Donald Hughson, Ser. No. 74,901, filed on the same date as the original application, Ser. No. 74,821, filed December 9, 1960 and having a common assignee. However, in accordance with the present invention, this train carried apparatus invented by Hughson has been supplemented as necessary to provide full automated control of the vehicle brakes, so that such vehicles may be safely operated on the stretch of single track between control locations as provides in accordance with the present invention.

It is furthermore proposed, in the selected embodiment of the present invention, to then employ a centralized traffic control system, such as, the type disclosed in the U.S. Patent to W. D. Hailes et al., No. 2,399,734 issued May 7, 1946, for providing track switch control and to establish the proper direction of track coding in a track layout including a stretch of single track between passing sidings in accordance with the desired train moves over this stretch of single track.

In the selected embodiment shown herein, it is more specifically proposed to provide that certain track codes provide throttle control on the trains while certain other track codes control the braking apparatus of the trains. For example, in the selected embodiment shown, 75, 120 and 180 code rates are utilized for slow, medium and fast throttle applications respectively whereas 37½ and STEADY code rates are utilized for providing service and emergency brake applications respectively. It should of course be understood that these specific code rates are chosen only for illustration and that both different and a greater number of code rates may be employed in practice, depending upon the extent of control required, without in any manner departing from the spirit or scope of the present invention. As used herein, the term "throttle" is intended to include any conventional means employed on railway vehicles for controlling the amount of driving power developed aboard the railway vehicles.

A general object of the present invention is to provide for controlling the operation of unmanned railway vehicles, in both directions, on a stretch of single track between two control locations such as the field locations in a CTC system.

A further object of the present invention is to transmit advance condition information, in the form of distinctive track code rates in such a stretch of single track, which will act upon the brake and throttle apparatus of railway vehicles, so as to control the performance of the vehicles over the stretch of track.

A still further object of the present invention is to provide for reducing the speed of railway vehicles over restrictive track conditions such as reversed track switches.

Other objects, purposes and characteristic features of the present invention will be in part obvious from the accompanying drawings, and in part pointed out as the description of the invention progresses.

Figure 2C:
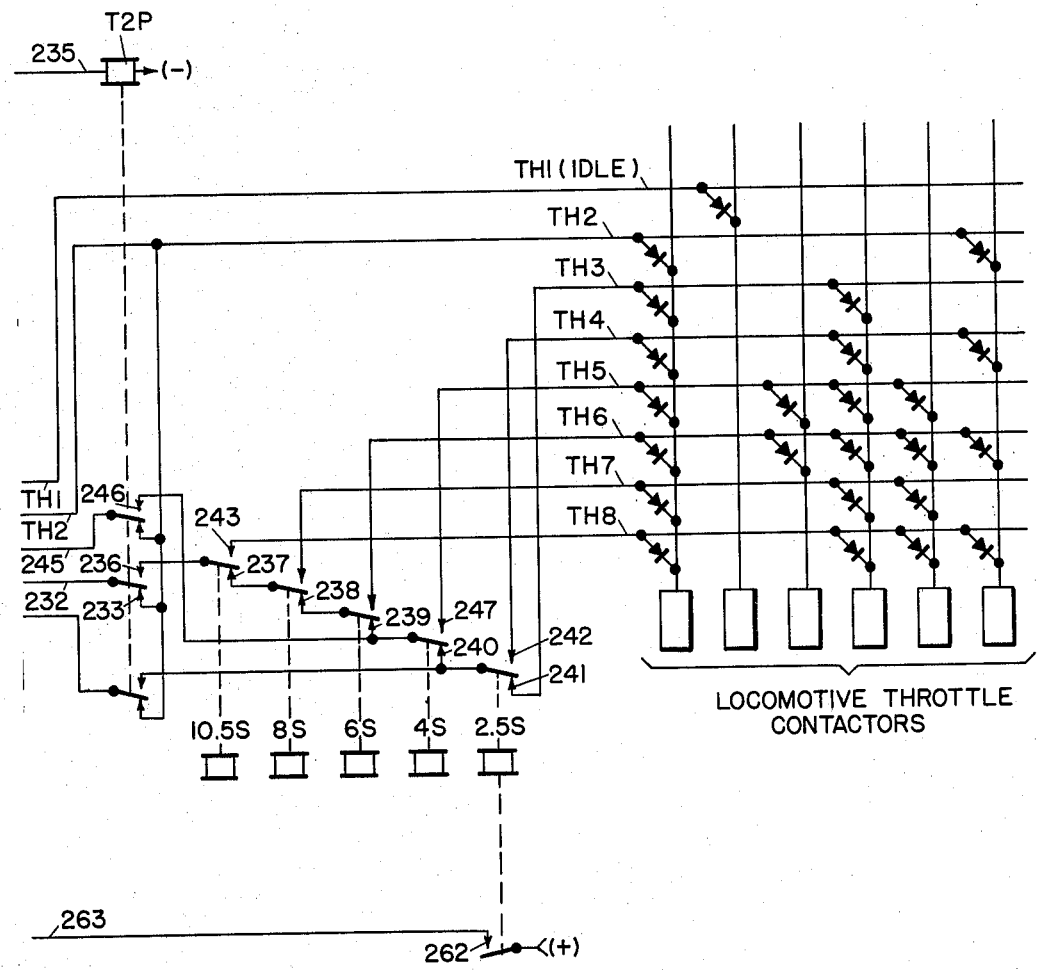

In describing the invention in detail, reference will be made to the accompanying drawings, in which like reference characters designate corresponding parts, and in which:

FIGS. 1A through 1L (except that FIG. 1I has been omitted), when placed side by side, illustrate a track layout including two passing sidings equipped with apparatus in accordance with one embodiment of the present invention; and FIGS. 2A through 2C illustrate the locomotive carried apparatus according to the same embodiment of the present invention.

In order to simplify the illustrates in the drawings and facilitate in the explanation of the fundamental characteristics of the invention, various parts and circuits have been shown diagrammatically in accordance with conventional symbols. Arrows with associated symbols (+) and (—) are employed to indicate connections of the circuits of the various relays to the opposite terminals of a suitable source of current for energization of such relays; and the source of current may be of any suitable characteristic for the purpose intended. The various contacts of the relays involved in the illustrations are shown conventionally as being in a lower or inclined position when the coil or winding of the associated relay is deenergized, and in a raised or horizontal position when the relay is energized; the contacts belonging to any given relay are shown connected to its coil or winding by dotted lines, and these contacts may be either below or above the illustration of the relay winding. The front and back contacts between which the movable contacts are operated by the different relays are shown conventionally as arrowheads and the movable contacts are ordinarily of the type which have their contacts pulled downwardly by gravity or by spring action. In addition, the reference characters BX and NX, shown throughout the accompanying drawings represent the terminals of an A.C. voltage supply and this voltage supply may also be of any suitable characteristic for the purpose intended.

*Wayside apparatus*

Referring now to the accompanying drawings, a stretch of main track is illustrated which extends between siding L, in FIGS. 1A and 1B and siding R, in FIGS. 1K and 1L. Siding L is connected to this main track by track switch LSW, in FIG. 1B, while siding R is connected to the main track through track switch RSW, in FIG. 1K.

According to usual railway practice, track switches LSW and RSW are provided with OS detector track circuits for detecting when a train is adjacent each track switch. For example, the OS detector track circuit for track switch LSW includes main track section LM1, in FIGS. 1A and 1B, and siding track sections LS1 and LS2. Of these, track sections LM1 and LS2 are provided with conventional track relays LM1T and LS2T respectively (see FIG. 1A), which are normally energized by conventional track batteries TB2, of FIG. 1B, and TB1 of FIG. 1A, respectively. The OS detector track relay L-OSTP, in FIG. 1B, is thus normally energized by a circuit extending from (+) in FIG. 1A, through front contacts 10 and 11 of relays LS2T and LM1T respectively, along wire 12 between FIGS. 1A and 1B, and to (−). To provide OS detection when a train is occupying siding track section LS1, in FIG. 1B, crossbond CBL is provided in addition to the usual crossbonds (not shown).

Referring now to FIGS. 1K and 1L, track switch RSW is provided with similar OS detecting apparatus, including relays RM1T, RS2T and R-OSTP for checking the occupancy of main track section RM1 and siding track sections RS1 and RS2. The remaining stretch of main track, extending between the right-hand end of track section LM1 and the left-hand end of track section RM1, is divided into a plurality of insulated track sections, designated in the accompanying drawings by reference characters S1 through S8.

Although the present invention is primarily concerned with control of unmanned railway trains, conventional trains (with engineman, etc.) may be required to utilize the track layout, and in keeping with this consideration, conventional wayside signals have been provided along the trackway. Referring now to FIGS. 1A and 1B, wayside signals 1RA and 1RB govern moves to the right out of siding L along the main and siding tracks respectively, while wayside signals 2LA and 2LB govern main line and siding moves respectively to the left into siding L. Similarly, signals 1LA and 1LB, in FIG. 1L, and signals 2RA and 2RB, in FIG. 1K, govern moves to the left and right respectively at siding R. In addition to the above, approach signals LAA and RAA, shown in FIGS. 1E and 1G respectively, provide approach indication, as will be described hereinafter, for trains towards sidings L and R respectively.

As mentioned above, the illustrated track layout is equipped for train moves to the right, from siding L, and to the left from siding R. This type of operation is generally referred to as station-to-station type operation. Since the illustrated wayside signals (1RA, 1RB, etc.) normally control the entrance to and the exit from the illustrated track layout, the locations of these various wayside signals will be hereinafter referred to as the control locations of the system.

In selected embodiment shown, the CTC system is employed in the conventional manner: (1) to clear the various wayside signals in accordance with the desired direction of traffic between the control locations at siding L and siding R, through the medium of the usual signal clearing relays GZ (see FIGS. 1A and 1L), (2) to establish the proper direction of coding in accordance with the designated direction of traffic, and (3) to properly position the track switches RSW and LSW in accordance with desired train moves at the control locations of sidings L and R.

From the above, it is seen that, in effect, the CTC system designates one of the control locations as the entrance control point and the other as the exit control point, depending upon the desired direction of traffic. Once a direction of traffic has been thus designated between sidings L and R, track codes are transmitted from the designated exit control point towards the entrance control point utilizing a dependent type of coding; i.e. the code rate applied to each track section (S1, S2, etc.) is dependent upon the conditions in advance of that section. In the accompanying drawings, the actual development of the various track codes is performed by a plurality of code oscillators CT, strategically located at various points in the track layout.

*Locomotive carried apparatus*

FIGS. 2A through 2C illustrate the apparatus carried on unmanned railway trains for controlling the operation of such trains in accordance with the various track codes employed in the selected embodiment of the present invention.

For illustration and simplicity of disclosure, the following table shows the various train running speeds arbitrarily selected to be associated with certain of the track codes employed in the selected embodiment of the present invention.

| Code rate | Speed Designation | Desired Running Speed, m.p.h. |
|---|---|---|
| 75 | Slow | 7 |
| 120 | Medium | 15 |
| 180 | Fast | 30 |

Referring now to FIG. 2A, the track codes are detected, in the track rails, by conventional locomotive receivers RC and are then decoded by conventional decoding apparatus, including master decoding transformer MT and decoding units DU to selectively energize associated code relays R, in accordance with the received track codes.

The unmanned locomotives also carry an axle driven frequency generator AG (see FIG. 2A) which supplies, as output, a frequency proportional to the actual speed of the locomotive. This frequency generator AG when is effective, by means of hi-pass filters HS, of FIG. 2A, to cause selective energization of a plurality of speed relays S (see FIGS. 2B and 2C) in accordance with the actual train speed; i.e., a speed relay is picked up as long as the train exceeds the speed, corresponding to the numerical designation for the speed relay. For example, speed relay 28S, of FIG. 2B, is picked up as long as the train exceeds 28 miles per hour.

This plurality of speed relays S is then divided into a plurality of speed range groups, each of which encompasses one of the desired running speeds employed in the selected embodiment of the present invention.

The selective energization of the plurality of code relays R then causes the proper speed range group to be effective to selectively energize a plurality of throttle control wires TH, in FIG. 2C, for controlling the throttle setting on the locomotive whereby the actual speed of the train is maintained substantially at the designated desired running speed, as called for by the received track code. Referring to FIG. 2C, it is intended here that the energization of throttle wires TH1 through TH8 respectively shall cause increasing application of the locomotive throttle by selective energization of a plurality of throttle contactors (see FIG. 2C) through the use of the illustrated diode matrix.

Over-speed control is also provided on the unmanned locomotive by apparatus, including over-speed filters OF, of FIG. 2A, and over-speed relay C, of FIG. 2B, which becomes deenergized, to initiate a timed service brake application, if the maximum permissive speed associated with the designated running speed is exceeded. The timing of such a service brake application is provided by timer T1 of FIG. 2B.

Timer T2 of FIG. 2B, is provided to prevent full throttle application to a locomotive getting under way and to further insure that full throttle will not be applied after an over-speed brake application.

As mentioned previously, the detection of a 27½ code rate by the locomotive carried apparatus initiates a full service application of the train brakes, which under normal operating conditions is sufficient to bring the train to a complete stop. Although the actual braking mechanism of the train is not illustrated in the accompanying drawings, it is intended here that the respective deenergization of magnet valves SMV and EMV, of FIG. 2B will respectively provide service and emergency brake applications on the train.

If for some reason the locomotive detects a STEADY code rate or a "no-code" condition, an emergency application of the train brakes results because of a deenergization of magnet valve EMV. An emergency brake application usually indicates a malfunctioning of either the locomotive carried apparatus or the wayside equipment and thus, after an emergency brake application, a manual reset is necessary to release the train brakes.

Although the above discussion was concerned with apparatus for unmanned locomotives, it should be understood that conventional locomotives may be equipped with cab signalling apparatus to provide indication to the engineman in accordance with the various track codes employed in the selected embodiment of the present invention.

*Normal conditions*

Before describing the operation of system, the assumed normal conditions will be discussed to establish a basis for such description. Referring now to the accompanying drawings, it will be assumed that no train moves have been designated by the control office and that the various control location signals are therefore all at "stop" with the associated signal repeater relays GP, YP and YGP therefore deenergized. In addition, approach locking relays 1RAS and 1LAS, of FIGS. 1A and 1L respectively, are thus normally energized, and these approach locking relays become deenergized when their associated signal 1RA and 1LA are cleared for train moves to the right and left respectively. It will be further assumed that no trains are present on the illustrated track circuits and therefore the OS track circuit relays OSTP are initially energized by the previously mentioned energizing circuits. Furthermore, in FIGS. 1B and 1L, relays LRWC and RRWC are deenergized while relays LNWC and RNWC are energized since it will be also assumed here that track switches LSW and RSW are initially in their normal positions for straight line moves.

In the accompanying drawings, that track coding condition is depicted for the assumed normal operating conditions of the system; i.e. all control location signals are at stop, no traffic moves designated, and no railway trains occupying the illustrated track layout. The code designations appearing in the accompanying drawings, above the various track sections S1 through S8, show the code rates that would therefore be present if the track code, initiated at siding R in FIG. 1K, is received at siding L in FIG. 1B. The development of the illustrated code rates will now be considered.

Code repeater relay 1RCP, in FIG. 1K, is normally steadily energized by a circuit extending from (+), in FIG. 1L, through back contact 13 of signal clearing relay 1LGZ, front contact 14 of approach locking relay 1LAS, along wire 15 between FIGS. 1L and 1K, through back contact 16 of signal repeater relay 2RA–YGP, back contact 17 of signal repeater relay 2RB–YP, front contact 18 of relay R–OSTP, back contacts 19, 20, 21 and 22 of relays LFS, 8LH, 8LFP, and RCFR respectively, and to (—). This picking up of relay 1RCP steadily connects the right-hand end of track section S8 to the A.C. voltage supply through transformer T1, full wave rectifier R1 and limiting resistor LR1. This A.C. voltage supply delivers a constant frequency alternating voltage of a certain frequency, for example, 100 cycles, to the primary winding of transformer T1 from whence it is rectified, so that the voltage now applied to track section S8 is substantially a D.C. voltage with a certain ripple of the frequency supplied by the A.C. voltage supply; i.e. section S8 is supplied with a STEADY code rate.

This STEADY code rate to track section S8 causes track relay 1RTR, at the left-hand end of section S8 in FIG. 1J, to be steadily energized through back contact 23 of relay 7LTR and limiting resistor LR2, which in turn picks up the associated front repeater relay 1RFP by a circuit extending from (+), through front contact 24 of relay 1RTR, and to (—). It should be mentioned here that relay 1RFP and the various other front repeater relays, utilized in the selected embodiment, are slow releasing type relays that remain energized as long as a track code is being received by the associated track relay TR.

Associated with each of the illustrated track sections is a decoding transformer DT which has a relay H connected to its secondary winding. In the usual decoding manner, these relays H are picked up as long as the primary winding of the associated decoding transformer DT is supplied with an interrupted input; i.e. a code rate other than STEADY. Thus decoding relay 1RH, in FIG. 1J, remains deenergized in response to the steady energization of track relay 1RTR, since the input voltage applied to decoding transformer DT1, through front contacts 25 and 26 of relay 1RTR and 1RFP respectively, does not induce a voltage in the secondary winding of decoding transformer DT1.

Code repeater relay 2RCP, of FIG. 1J, is now energized at a 37½ code rate by a circuit extending from (+), through front contact 27 of code oscillator 37½CT, front contact 28 of front repeater relay 1RFP, back contact 29 of relay 1 RH, back contact 30 of relay 7LFP, and to (—). This interrupted energization of code repeater relay 2RCP then causes a 37½ code to be applied to the right-hand end of track section S7, in FIG. 1J, by intermittently connecting track section S7 to the A.C. voltage supply through front contact 31 of the relay 2RCP, limiting resistor LR3, rectifier R2, and transformer T2.

This 37½ code advances to the left-hand end of track sections 7 in FIG. 1H, so as to intermittently energize track relay 2RTR at the same code rate, through back contact 32 of relay 6LTR. In addition to picking up the associated front repeater relay 2RFP, this intermittent energization of track relay 2RTR furthermore energizes the primary winding of decoding transformer DT2 first in one direction and then the other, according to usual practice in decoding circuits, through movable contact 33 of track relay 2RTR, so as to energize the associated slow releasing relay 2RH by a circuit including the secondary winding of transformer DT2 and movable contact 34 of relay 2RTR. This energization of relay 2RH now completes an energizing circuit, including its own front contact 35, for code oscillator 75CT in FIG. 1H.

Code repeater relay 3RCP is now energized at a 75 code rate by a circuit extending from (+), in FIG. 1H, through front contact 36 of code oscillator 75CT, back contact 37 of decoding relay 180DR, front contact 38 of relay 2RH, back contact 38A of relay 6LFP, and to (—). It will be noted in FIG. 1H that decoding units 120DU and 180DU are connected, in multiple, across decoding transformer DT2 so as to energize decoding relay 180DR if transformer DT2 is energized at either of these two code rates.

The right-hand end of track section S6 is thus supplied with a 75 code rate which is received at the left-hand end of this track section S6 by track relay 3RTR, in FIG. 1G. In addition to causing energization of the associated front repeater relay 3RFP, this 75 code rate energization of track relay 3RTR furthermore intermittently energizes the primary of decoding transformer DT3 and therefore causing relay 1H to be steadily energized by a circuit including movable contact 39 of relay 3RTR, the secondary of decoding transformer DT3, and back contact 40 of relay 5LTR.

Code repeater relay 4RCP is now energized at a 180 code rate by a circuit extending from (+), through front contact 41 of code oscillator 180CT, front contacts 42 and 43 of relay 3RFP and 1H respectively, back contact 44 of relay 5LFP, and to (−). This interrupted energization of code repeater relay 4RCP now causes a 180 code rate to be applied to the right-hand end of track section S5.

Referring once again to FIG. 1G, the (+) and (−) designation adjacent the operating coil ROC of approach signal RAA represent the relative polarities of energization that are applied to operating coil ROC to have signal RAA display its green or yellow aspects. In response to the 75 code rate received by track relay 3RTR, the energizing circuit for the operating coil ROC of approach signal RAA extends from (+), through back contact 45 of relay 5LFP, front contacts 46 and 47 of relays 1H and 3RFP respectively, back contact 48 of decoding relay 180DR, through the operating coil ROC of approach signal RAA, and to (−), through back contact 49 of relay 180DR. Thus, approach signal RAA displays its yellow aspect. Although any suitable type of wayside signals may be utilized in conjunction with the selected embodiment of the present invention, that type of signal is illustrated, wherein the aspect of the signal is dependent upon the polarity of energization to the operating coil of the signal.

The 180 code rate, in section S5, is now received at the left-hand end of section S5 by relay 4RTR of FIG. 1F, and results in the energization of relays 4RFP and 2H in a manner previously discussed. Code repeater relay 5RCP is thus energized at a 180 code rate by a circuit extending from (+) in FIG. 1F, through front contacts 50 and 51 of code oscillator 180CT and relay 2H respectively, back and front contacts 52 and 53 of relays 4LFP and 4RFP respectively, and to (−), so that the right-hand end of section S4 is also supplied with a 180 code rate.

Advancing to the left-hand end of the track section S4, in FIG. 1E, this 180 code rate causes relays 5RFP and 3H to be steadily energized as is fully discussed above. Code repeater relay 6RCP is now energized at a 120 code rate, for reasons which will be discussed later, by a circuit extending from (+), through "stop" contacts 54 and 55 of the approach signal LAA, front contact 56 of code oscillator 120CT, back contact 57 of switch correspondence repeater relay LNWCP, front contact 58 of relay 3H, back contact 59 of relay 3LFP, front contact 60 of relay 5RFP, and to (−).

The 120 code rate now applied to the right-hand end of track section S3 advances to the left and results in the energization of relay 6RTR at this same 120 code rate. In addition to completing the obvious energizing circuit for front repeater relay 6RFP, this coded energization of relay 6RTR also applies a 120 code rate to track section S2, through transformer T3, rectifier R3 and limiting resistor LR4.

This 120 code rate then advances, to the left through the remaining track sections S2 and S1, in a manner previously discussed, and causes track relay 8RTR, in FIG. 1B, to be energized at a 120 code rate. Furthermore, front repeater relay 8RFP and relay 8RH are thus steadily energized as a result of the code rate being received by track relay 8RTR. Referring to FIG. 1B, this energization of relays 8RH and 8RFP opens the energizing circuit for code repeater relay 1LCP, in FIG. 1B, at their respective back contacts 61 and 62. It should also be noted, in FIGS. 1A and 1B, that the energization of relays 8RH and 8RFP are two of the conditions that must be met before wayside signal 1R (see FIG. 1A) may be cleared for permitting a train to advance, to the right, from the control location at siding L.

If it were not for the assumption this coding initiated at siding R had made its way down to siding L, and, that relays 8RH and 8RFP are thus now picked up, code repeater relay 1LCP, in FIG. 1B, could also be steadily energized by a circuit similar to that described for the steady energization of code repeater relay 1RCP in FIG. 1K. Thus, if it is now assumed that the coding from siding R has not been received at siding L, by relay 8RTR, both code repeating relays 1RCP and 1LCP will be energized and oppositely directed track codes would be simultaneously transmitted towards each other in that stretch of main track illustrated between sidings L and R. This obviously would give rise to an undesirable code fight. For the purpose of quickly resolving any such code fight that may result because of simultaneous energization of the above mentioned code repeating relays, certain code fight circuits have been provided in the circuit organization of the selected embodiment.

Referring to FIGS. 1A through 1L of the accompanying drawings, it will be noted that the wayside circuits to the left of track section S4 are substantially the same as those to the right of track section S5. Assuming now that code repeater relays 1LCP and 1RCP are both steadily energized at substantially the same time, oppositely directed 180 codes will thus be transmitted from the right and left hand ends of track sections S5 and S4 respectively, and will come together at the junction of track sections S4 and S5, in FIG. 1F. Consequently, front repeater relays 4LFP and 4RFP will both be energized. However, the energization of front repeater relay 4RFP opens back contact 63 of this relay and thus renders code repeater relay 5LCP ineffective to transmit track codes to the right in section S5, whereas the similar energization of front repeater relay 4LFP causes code repeater relay 5RCP to be steadily energized by a circuit extending from (+) in FIG. 1F, through front contacts 64 and 53 of relays 4LFP and 4RFP respectively, and to (−).

This steady energization of code repeater relay 5RCP causes a STEADY code rate to be applied to the right-hand end of track section S4 which results in the energization of track relay 5RTR, of FIG. 1E, and the associated front repeater relay 5RFP. As soon as front repeater relay 5RFP is picked up, code repeater relay 4LCP is deenergized, by the opening of back contact 65 of relay 5RFP, to prevent any code from being transmitted from the left-hand end of track section S4. In addition, code repeater relay 6RCP is now also steadily energized by a circuit extending from (+) in FIG. 1E, through front contacts 66 and 60 of relays 3LFP and 5RFP respectively, and to (−) so that track section S3 is also energized with a STEADY code rate. The reception of this STEADY code rate by track relay 6RTR, of FIG. 1D, then causes front repeater relay 6RFP to be steadily energized.

Code fight relay LCFR, in FIG. 1B, is now picked up by a circuit extending from (+) and (−), in FIG. 1D, through front contacts 67 of relay 6RFP, front contacts 68 of relay 2LFP, along wires 69 between FIGS. 1D and 1C, through back contacts 69A of relay 7RFP, through front contacts 70 of relay 1LFP, along wires 71 between FIGS. 1C and 1B, and through back contacts 72 of traffic stick relay RFS. As soon as code fight relay LCFR picks up, code repeater relay 1LCP is deenergized by the opening of back contact 73 of relay LCFR, and the track code initiated at siding R may now make its way to siding L so as to energize relays 8RTR, 8RFP, and 8RH, as previously described, for purposes which will become clear as the description progresses.

It should be pointed out at this time that the arrow on the windings of code fight relays LCPR and relay LBK represents the direction of current flow necessary to pick up these relays, assuming conventional current flow from (+) to (−).

Generally speaking now, it is apparent that a track code, transmitted from the control location at siding R, will predominate; i.e. shut off any code from siding L; as long as it reaches track section S5, so as to energize front repeater relay 4RFP. However, if a code from siding L should be received by relay 5LTR, in FIG. 1G, front repeater relay 5LFP would be energized to initiate the cancellation of any coding from siding R.

Referring now to FIGS. 1B and 1K, each control location is provided with a block relay BK whose energizing circuit extends from the control location to the approach signal which governs train movements towards the siding associated with that control location. For example, the energizing circuit for block relay RBK, of FIG. 1K, extends from (+) to (−) in FIG. 1G, through front contacts 74 of relay 3RFP, along wires 75 between FIGS. 1G and 1H, through back contacts 76 of relay 6LFP and front contacts 77 of relay 2RFP, along wires 78 between FIGS. 1H and 1J, through back contacts 79 of relay 7LFP and front contacts 80 of relay 1RFP, along wires 81 between FIGS. 1J and 1K, and through back contacts 82 of relay LFS, so that relay RBK is energized only if a code from siding R is received at the left-hand end of track section S6. Thus, for the assumed coding condition shown in the drawings, the above described energizing circuit for relay RBK is completed and therefore relay RBK is energized. Remembering now that the control location at each siding is also provided with a relay H (for example, relay 8RH) which is energized by a code from the other siding, it is apparent that these relays (8RH, 8LH, LBK and RBK) can be used for indication purposes, as well as for performing certain other control purposes, and therefore dotted lines bearing the designation "INDICATION" is connected to the windings of these relays. For example, the dropping away of relay RBK will indicate that the main track between siding R and approach signal RAA is occupied, while the dropping away of relay 8RH will indicate that any part of the main track, between the left-hand end of section S1 and the right-hand end of section S8, is occupied. Referring now to FIG. 1K, it should be noted that the dropping away of OS detector track relay R-OSTP will open the energizing circuit for code repeater relay 1RCP, of FIG. 1K, and therefore, the above mentioned relays RBK and 8RH will further indicate when the OS detector track circuit for switch RSW is occupied.

Before discussing the operation of unmanned railway trains on the illustrated track layout shown in FIGS. 1A through 1L, a discussion of the locomotive carried apparatus, of FIGS. 2A through 2C, responding to the various track code rates employed in the selected embodiment of the present invention will be set forth.

Referring now to FIGS. 2A through 2C, that condition of the locomotive carried apparatus is depicted wherein a 37½ code rate is being received by the locomotive, and since this code rate has been previously associated with a service application of the train brakes, it is also assumed here that the train is at a standstill. The reception of this assumed 37½ code rate, by receivers RC of FIG. 2A, is effective, by means of code repeater relay CR, master decoding transformer MT, and decoding unit 37½DU, to selectively energize code relay 37½R. Repeater relay 37½RP, of FIG. 2A, is thus energized by a circuit extending from (+), through front contact 200 of code relay 37½R and to (−).

Referring to FIG. 2B, relay EMB is normally maintained in its picked up position by a stick circuit including its own front contact 201, wire 202 between FIGS. 2B and 2A, and a plurality of front contacts of relays 37½RP, 75RP, 120RP and 180RP, connected in multiple. Thus, the aforementioned energization of repeater 37½RP is effective to maintain relay EMB, of FIG. 2B, energized by the stick circuit extending from (+) in FIG. 2A, through front contact 203 of repeater relay 37½RP, along wire 202 between FIGS. 2A and 2B, through front contact 201 of the normally energized relay EMB, and to (−). Magnet valve EMV is thus also energized, through front contact 204 of relay EMB, to prevent an emergency brake application to the train. It should be noted in FIG. 2B, that once relay EMB is deenergized to initiate an emergency brake application, manual reset push button MR would have to be operated before the train brakes can be released.

With a 37½ code rate being received on the locomotive, relay EPVR, in FIG. 2B, is deenergized to thus deenergize magnet valve SMV (to supply service application of the train brakes) and is furthermore effective to operate time T1 by a circuit extending from (+) through back contact 205 of relay EPVR, and to timer T1. In the accompanying drawings, movable contact 206 of timer T1 is assumed to have completed its timing operation; i.e. has completed its movement from the dotted left-hand position, in the direction of the small arrow, and now makes contact with the right-hand contact 207 of timer T1.

Referring now to FIG. 2A of the accompanying drawings, oscillator OSC normally provides an output frequency which is high enough to be passed through any of the over-speed filters OF and thus causes an output from such over-speed filters OF to be fed along wire 208 between FIGS. 2A and 2B, to amplifier A1, and to thus cause energization of relay D. Such energization of relay D then causes a subsequent energization of its repeater relay DP by a circuit extending from (+) in FIG. 2B, through front contact 209 of relay D, and to (−). However, as soon as repeater relay DP picks up, oscillator OSC in FIG. 2A, is shut off by the opening of back contact 210 of relay DP which opens wire 211 extending from FIG. 2B to the oscillator OSC in FIG. 2A. This then causes relay D, in FIG. 2B, to be deenergized, which in turn deenergizes repeater relay DP and causes oscillator OSC in FIG. 2A to again provide output, along wire 208 between FIGS. 2A and 2B, to amplifier A1. Thus, in the initial conditions, relays D and DP act to dependently pulse one another.

The pulsing of repeater relay DP causes capacitor 212, in FIG. 2B, to be intermittently charged through front contact 213 of relay DP and results in the retainment of slow drop away over-speed relay C in a picked up position.

Referring to FIGS. 2A through 2C, all other relays are in their normal deenergized positions and timer T2, in FIG. 2B, is in its right-hand or reset position in accordance with the energization of the reset wire for this timer by a circuit extending to (+) through back contact 214 of relay EPVR.

To further explain the operation of the locomotive carried apparatus of FIGS. 2A through 2C, it will now be assumed that a 180 code rate, calling for the maximum desired train speed of thirty miles per hour, is received by receivers RC of FIG. 2A. This 180 code rate is then effective, by means of relay CR, master decoding transformer MT and decoding unit 180DU, to energized code relay 180R in FIG. 2A. This energization of code relay 180R causes overspeed filter OF34 to be connected to the output of amplifier A2 through front contact 215 of code relay 180R. At the same time, repeater relay 180RP is energized by a circuit extending from (+) in FIG. 2A, through back contacts 216, 217 and 218 of code relays 37½R, 75R and 120R respectively, front contact 219 of code relay 180R, and to (−). These various repeating relays RP are made slow releasing to prevent an emergency brake application from being initiated when changing from one code rate to another.

With the train at a standstill, relay EPVR in FIG. 2B, is now energized by a circuit extending from (+) in FIG. 2A, through front contact 220 of repeater relay 180RP, along wire 221 between FIGS. 2A and 2B, front contact 222 of over-speed relay C, diode D1, right-hand contact 207 and timer T1, back contact 223 of speed repeater relay 2.5SP, and to (−). It should be mentioned at this time that diodes D1 through D3, in FIG. 2B, are provided to isolate the throttle controls provided by one code rate from those controls delegated to a different code rate.

As soon as relay EPVR becomes energized, the stick circuit is provided for this relay, including its own front contact 224, which maintains relay EPVR picked up as long as over-speed relay C is picked up and a running speed code rate (75, 120 or 180) is being received.

This picking up of relay EPVR also causes release of the brakes by completing the energizing circuit for magnet valve SMV of FIG. 2B, this circuit extending from (+), through front contact 225 of relay EPVR, and to (−). As previously mentioned, it is intended here that the brakes will be selectively applied (to provide service brake application) or released, depending up whether magnet valve SMV is deenergized or energized respectively.

With magnet valve SMV energized, and the brakes thus released, the setting of the locomotive throttle is successively increased to start the train in motion. As previously mentioned, timer T2 in FIG. 2B, is provided to prevent full throttle application to a train getting under way and such control is provided by initiating the timing operation of timer T2 dependent upon the picking up of relay EPVR; i.e. timer T2 is energized through front contact 226 of relay EPVR.

Assuming now that timer T2 has not as yet completed its timing operation, throttle wire TH2 in FIG. 2C, is energized to provide a certain minimum forward throttle application, by a circuit extending from (+) in FIG. 2A, through front contact 220 of repeater relay 180RP, along wire 221 between FIGS. 2A and 2B, through front contact 227 of over-speed relay C, front contact 228 of relay EPVR, back contact 229, 230 and 231 of speed relays 32S, 30S and 28S respectively, along wire 232 between FIGS. 2B and 2C, and through back contact 233 of relay T2P.

Assuming now that timer T2 has completed its timing operation, so that movable contact 234 now connects (+) in FIG. 2B to wire 235, relay T2P is now energized by a circuit extending from (+) in FIG. 2B, along wire 235 between FIGS. 2B and 2C, and to (−). Wire 232 in FIG. 2C, is now connected to front contact 236 of relay T2P and causes throttle wire TH3 to be energized (to increase the train speed) through back contacts 237 through 241 of relays 10.5S, 8S, 6S, 4S and 2.5S respectively.

As the speed of the train now increases, a point is reached where speed relay 2.5S picks up and causes throttle wire TH4 to be energized, through front contact 242 of relay 2.5S which further increases the speed of the train. Similarly, as the remaining relays in this group pick up, the locomotive throttle setting is successively increased until throttle wire TH8 is energized through front contact 243 of relay 10.5S. Full throttle application is now supplied to the locomotive and causes rapid increase in the train speed.

As soon as the output from the axle driven frequency generator AG in FIG. 2A, indicates that the train has passed 28 miles per hour, relay 28S is energized, by means of high-pass filter HS28, and lowers the throttle setting by energizing throttle wire TH5 in FIG. 2C, instead of wire TH8, by a circuit extending from (+) in FIG. 2A through front contact 220 of repeater relay 180RP, along wire 221 between FIGS. 2A and 2B, through front contact 227 of over-speed relay C, front contact 228 of relay EPVR, back contacts 229 and 230 of speed relays 32S and 30S respectively, front contact 244 of speed relay 28S, along wire 245 between FIGS. 2B and 2C, through front contact 246 of relay T2P, and through front contact 247 of speed relay 4S. Similarly, as soon as the actual train speed exceeds 30 miles per hour, speed relay 30S is energized and causes energization of throttle wire TH2, in FIG. 2B, through front contact 248 of relay 30S, to further reduce the throttle application for the locomotive. It is expected that such energization of throttle wire TH2 will maintain the train speed at a constant 30 miles per hour in keeping with the desired speed, designated by the received 180 code rate.

However, if the train speed should increase to above 32 miles per hour, the throttle setting is reduced to "idle" by energization of throttle wire TH1 in FIG. 2B, upon closure of front contact 249 of speed relay 32S. This then would cause the speed to be reduced to the desired 30 miles per hour. Obviously, if the actual speed of the train drops below 30 miles per hour, throttle wire TH5 would again be energized, as described above, to increase the throttle setting and thus increase the speed of the train back up to 30 miles per hour.

If for some reason the train exceeds its maximum permissive speed limit of 34 miles per hour, for the 180 code rate, the output from the axle driven frequency generator AG, in FIG. 2A, is effective to produce an output from over-speed filter OF34 and steadily energizes wire 208 between FIGS. 2A and 2B, to maintain relay D in FIG. 2B, steadily energized. This in turn causes repeater relay DP to be steadily energized and opens the energizing circuit between capacitor 212 and over-speed relay C, so as to drop this over-speed relay. It will be noted in FIG. 2B that the dropping away of over-speed relay C opens the above described stick circuit for relay EPVR, at front contact 222 of over-speed relay C, and relay EPVR is thus deenergized, to start timer T1 and deenergize magnet valve SMV to initiate a timed service application of the brakes. Furthermore, the locomotive throttle setting is now reduced to "idle" due to the energization of throttle wire TH1 in FIG. 2B, through back contact 250 of overspeed relay C.

After timer T1 has completed its timing operation, relay EPVR is once more energized, provided the speed of the train has been reduced sufficiently to return relays D and DP to their normal pulsing condition (below the maximum speed limit of 34 miles per hour), by a circuit extending from (+) in FIG. 2A through front contact 220 of relay 180RP, along wire 221 between FIGS. 2A and 2B, through front contact 222 of over-speed relay C, diode D1, contact 207 of timer T1, front contact 251 of speed relay 5S, and to (−).

It will be noted in FIG. 2B that the dropping away of relay EPVR also causes timer T2 to be reset to its normal position and relay T2P of FIG. 2C, to drop away, and upon the subsequent picking up of relay EPVR, the timing operation for timer T2 is again initiated to insure that the throttle setting cannot now be increased past that value associated with the energization of throttle wire TH2 (see FIG. 2C). From the drawings and the discussion above, it is thus seen that timer T2 not only prevents full throttle application to a starting locomotive but also prevents high throttle application to a locomotive which has received an over-speed brake application.

With the train now travelling at the desired 30 miles per hour, in response to the 180 code rate, assume that the received code rate is now changed from 180 to 120, thus calling for a speed reduction to 15 miles per hour. Relay 120R in FIG. 2A is now energized upon reception of this 120 code rate and is effective to energize its repeater relay 120RP by a circuit extending from (+) in FIG. 2A, through back contacts 216 and 217 of relays 37½R and 75R respectively, front contact 252 of relay 120R, and to (−).

Over-speed filter OF19 is now connected to the output of amplifier A2 by the obvious circuit in FIG. 2A, and because of the existing thirty miles per hour speed of the train, the output of the axle driven frequency generator AG, applied to amplifier A2, is effective to steadily energize wire 208 between FIGS. 2A and 2B. As mentioned above, such energization of wire 208 causes relays D and DP to be steadily energized so as to drop over-speed relay C.

At this time, throttle wire TH1 in FIG. 2B, is once more energized, to set the locomotive throttle to "idle," by a circuit extending from (+) in FIG. 2A, through back contact 253 of relay 180RP, front contact 254 of relay 120RP, along wire 255 between FIGS. 2A and 2B, and through back contact 256 of over-speed relay C. Furthermore, the dropping away of over-speed relay C opens the existing stick circuit for relay EPVR, to drop this relay, and thus deenergize magnet valve SMV to provide a service application of the brakes.

This service brake application is now continued (even though the timing operation of timer T1 may have ended) until the speed of the train drops below 19 miles per hour, at which time relays D and DP are returned to their normal pulsing conditions to steadily maintain over-speed relay C in a picked up position.

As soon as over-speed relay C picks up, relay EPVR is once more energized, under present conditions by a circuit extending from (+) in FIG. 2A, through back contact 253 and front contact 254 of relays 180RP and 120RP respectively, along wire 255 between FIGS. 2A and 2B, through front contact 257 of over-speed relay C, diode D2, contact 207 of timer T1 (assuming of course that this timer has completed its timing operation), through front contact 251 of speed relay 5S, and to (−). Thus, the brakes are now released.

Referring now to FIG. 2B, if, at the end of this braking application, speed relay 17S is picked up, throttle wire TH1 will remain energized through front contact 258 of overspeed relay C, front contact 259 of relay EPVR, and front contact 260 of speed relay 17S, to further slow down the train to its desired speed of 15 miles per hour. The speed then continues to decrease such that speed relay 17S is also dropped away and the locomotive throttle setting is now increased, by energization of throttle wire TH2 in FIG. 2B, through front contact 261 of speed relay 15S, to hold the speed at its desired value of 15 miles per hour. If a 75 code rate is now received on the locomotive, calling for a desired running speed of 7 miles per hour, over-speed filter OF9 would be connected to amplifier A2 in FIG. 2A, to slow down the train in substantially the same manner as described above for reception of a 120 code rate.

It has been observed, especially in the low speed operation of long trains, that a condition may arise where a reapplication of locomotive throttle, after a braking application, may cause separation of the train. It is believed that such a condition results because of the propagation time required to release the brakes over the entire length of the train and furthermore due to the observed rapid increase in the co-efficient of braking friction at such low speeds. Thus, if forward throttle is applied to a train travelling at low speed, upon which the brakes towards the rear of the train have not had sufficient time to release, the heavy holding action of these rear brakes may cause separation of the train.

For protecting against such a condition, in the selected embodiment of the present invention, front contact 251 of speed relay 5S and back contact 223 of speed repeater relay 2.5SP are connected in multiple in the energizing circuit for relay EPVR. Thus, front contact 251 of speed relay 5S insures that the brakes cannot be released if, after an initial service brake application, the train speed is too low (below 5 miles per hour); i. e. the train speed has entered the critical region mentioned above wherein separation of the train may result from reapplication of the locomotive throttle, and back contact 223 of speed repeater relay 2.5SP furthermore insures that under such a condition, described above, the train will come to a complete stop before the brakes are released. Referring now to FIGS. 2B and 2C, speed repeater relay 2.5SP is energized at train speeds above 2.5 miles per hour by a circuit including front contact 262 of speed relay 2.5S and wire 263 between FIGS. 2C and 2B.

Although 5 miles per hour has arbitrarily selected, in the above discussion, as defining the upper speed limit for the above mentioned critical speed region, it should be understood at this time that this choice was made merely for simplicity of disclosure and that some other train speed, such as 15 miles per hour, may be preferred depending upon the requirements of practice.

Suppose now that with the train travelling at one of its desired running speeds, a 37½ code rate is received, calling for a full service application of the train brakes. Over-speed filter OF2 is thus connected to the axle driven frequency generator AG through amplifier A2 in FIG. 2A. Since the locomotive speed is well above two miles per hour, the output of frequency generator AG is sufficient to maintain relays D and DP steadily energized. This of course causes over-speed relay C to drop away and initiate service application of the brakes, as is fully described above.

When the speed of the train is reduced below two miles per hour, oscillator OSC in FIG. 2A, is once again effective to start a normal dependent pulsing of relays D and DP, which returns over-speed relay C to its normal energized position. However, according to FIGS. 2A and 2B, since a 37½ code rate is being received, this picking up of over-speed relay C is ineffective to cause reenergization of relay EPVR, for releasing the train brakes. Thus, the train is brought to a complete stop.

It should be noted in FIG. 2B, that the "idle" throttle wire TH1 is energized, during this service brake application, by a circuit extending from (+) in FIG. 2A through back contacts 253, 264 and 265 of repeating relays 180RP, 120RP and 75RP respectively, and along wire 266 between FIGS. 2A and 2B.

Referring now to FIGS. 2A and 2B, it will be noted that if a steady code rate is received on the locomotive, or if a "non-coding" condition exists, wire 202 between FIGS. 2A and 2B will be deenergized, to drop relay EMB, for providing an emergency application of the train brakes. As mentioned previously, a manual resetting of relay EMB is now required, by operation of the manual reset push button MR of FIG. 2B, before the brakes may be released to allow the train to proceed.

In order to more specifically describe the operation of the illustrated embodiment of the present invention, it will now be assumed that a train equipped with the apparatus illustrated in FIGS. 2A through 2C, is approaching signal 1RA from the left in FIG. 1A, and further that the control office wishes to advance this train up to signal 2R (FIG. 1K) at "stop." The control office then transmits a control to the control location at siding L, for clearing signal 1RA through the medium of signal clearing relay 1RGZ. As soon as signal 1RA is then cleared, approach locking relay 1RAS becomes dropped away as mentioned previously. It should be pointed out at this time that signal clearing relay 1RGZ will be deenergized as soon as the train, in question, accepts signal 1RA and furthermore that the reference designation XX, in FIG. 1A, represents various other selections that may be transmitted from the control office, such as clearing signal 2L and also represents the various other conditions, dictated by the requirements of practice, that must be considered when clearing a signal.

Since it was previously assumed that the illustrated 120 code rate is being received by relay 8RTR, in FIG. 1B, traffic stick relay RFS is now energized by a circuit extending from (+) in FIG. 1A, through front contact 83 of relay 1RGZ, along wire 84 between FIGS. 1A and 1B through front contact 85 of relay 8RH, and to (−). Referring to FIG. 1B, this picking up of traffic stick relay RFS assures that code repeater relay 1LCP of FIG. 1B will not transmit any track codes to the right in the main track sections S1 through S8, until after the selected move has been completed.

This picking up of traffic stick relay RFS, of FIG. 1B, also causes switch correspondence repeater relay LNWCP, in FIG. 1E, to be energized by a circuit extending from (+) in FIG. 1B, through either front contact 86 of relay LNWC or front contact 87 of detector track relay L-OSTP, front contact 88 of relay RFS, along wire 71 between FIGS. 1B and 1C, through back contact 70A of relay 1LFP, along wire 69 between FIGS. 1C and 1D, through back contact 89 of relay 2LFP, along wire 90 between FIGS. 1D and 1E, through back contact 91 of relay 3LFP, through the winding of relay LNWCP and back to (—) in FIG. 1A, along the circuit including the lower back contact 91 of relay 3LFP, wire 90 between FIGS. 1E and 1D, back contact 89 of relay 2LPF, wire 69 between FIGS. 1D and 1C, back contact 70A of relay 1LFP, wire 71 between FIGS. 1C and 1B, and front contact 88 of relay RFS.

Referring to FIG. 1E of the accompanying drawings, it will be noted that with relay LNWCP thus energized, code repeater relay 6RCP is now energized at a 180 code rate, instead of the illustrated 120 code rate, since movable contact 92 of relay LNWCP is now in a picked up or horizontal position wherein it engages front contact 93 of the same relay, so as to cause code oscillator 180CT to be effective in energizing code repeater relay 6RCP, by a circuit extending from (+), through contacts 54 and 55 of approach signal LAA, front contact 94 of code oscillator 180CT, front contact 93 of relay LNWCP, front contact 58 of relay 3H, back contact 59 of relay 3LFP, front contact 60 of relay 5RFP, and to (—). This 180 code rate is then applied to the right-hand end of track section S3 and consequently advances through track sections S2 and S1 so as to retain relays 8RFP and 8RH, of FIG. 1B, in their assumed normal energized position.

With traffic stick relay RFS picked up as described above, signal 1RA, of FIG. 1A, is now cleared by a circuit extending from (+), in FIG. 1A, through front contact 95 of relay 1RGZ, along wire 96 between FIGS. 1A and 1B, through front contacts 97, 98, 99 and 100 of relay L–OSTP, RFS, 8RH and 8RFP respectively, back contact 101 and front contact 102 of switch correspondence relays LRWC and LNWC respectively, along wire 103 between FIGS. 1B and 1A, through the operating coil OC1 of signal 1RA, and to (—). Signal 1RA now displays its green aspect. Obviously, if the approaching train is unmanned, the display of signal 1RA is of no value. As mentioned previously, the illustrated wayside signals are included mainly to accomodate any conventional trains that may be required to utilize the illustrated track layout, and although such signals may perform certain other functions in the selected embodiment, it should be understood at this time that such functions may also be performed by various other apparatus such as relays etc., without in any manner departing from the spirit or scope of the present invention.

Referring now to FIG. 1A of the accompanying drawings, this clearing of signal 1RA causes green repeater relay 1RA–GP to be energized and therefore a 180 code rate is applied to the right-hand end of track section LM2 by code repeater relay MRCP; i.e. relay MRCP is energized at a 180 code rate by a circuit extending from (+), through front contact 104 of code oscillator 180CT, front contact 105 of relay 1RA–GP, and to (—). It should be understood at this time that the designation YY, in FIG. 1A, refers to various other conditions that would normally be required for energization of code repeater relay MRCP and such conditions may be considered substantially equivalent to those required for the energization of code repeater relays 1LCP and 1RCP of FIGS. 1B and 1K respectively.

The locomotive carried apparatus, illustrated in FIGS. 2A through 2C of the accompanying drawings, then responds to the 180 code rate present in track section LM2, as is fully described above, and causes the approaching train to traverse track section LM2 at its maximum speed of 30 miles per hour. As soon as the train advances past signal 1RA, relay 1RGZ is actuated to its deenergized position as was fully described above.

With the train now occupying track section LM1, track relay LM1T is deenergized because of the shunting effect of the train on track battery TB2, and the OS detector track relay L–OSTP, of FIG. 1B, is now deenergized due to the opening of front contact 11 of relay LM1T. With relay L–OSTP dropped away, a stick circuit is now completed for traffic stick relay RFS, of FIG. 1B, and extends from (+) in FIG. 1B, through front contact 106 of relay RFS, back contact 107 of relay L–OSTP, front contact 85 of relay 8RH, and to (—). At the same time, relay LMRV, of FIG. 1B is energized by a circuit extending from (+) in FIG. 1A, through back contact 108 of track relay LM1T, along wire 109 between FIGS. 1A and 1B, through front contacts 110 and 111 of relays LNWC and 8RH respectively, and to (—).

The primary winding of transformer VT1, of FIG. 1B, is now connected to the terminals of the A.C. voltage supply by a circuit extending from terminal BX of the A.C. voltage supply, through front contact 112 of code oscillator 180CT, front contacts 113 and 114 of relays LNWC and LMRV respectively, through the primary winding of transformer VT1, and to terminal NX of the same A.C. voltage supply. A 180 code rate is thus applied to the right-hand end of track section LM1 via transformer VT1, rectifier VR1 and transformer VT2. The train then may continue to proceed, on track section LM1, at its maximum speed of 30 miles per hour.

As soon as the train advances onto track section S1, in FIG. 1A, relay 8RH is deenergized due to the loss of code at track relay 8RTR. Since traffic stick relay RFS is slow releasing, the stick circuit for relay RFS is thus shifted and, under present conditions, now extends from (+), through front contact 115 of relays RFS, back contact 116 of relay 8RH, and to (—). It is evident that this traffic stick relay RFS will thus remain in its energized position until a track code is once more received by track relay 8RTR, which will energize relay 8RH and thus disconnect the now existing stick circuit for relay RFS.

Recalling now that 180 code rates exist in all track sections up to approach signal RAA, the train continues to proceed, at its maximum speed of 30 miles per hour, until it reaches section S6.

As soon as the train accepts signal RAA and enters the left-hand end of track section S6, in FIG. 1G, the locomotive carried apparatus of FIGS. 2A through 2C operates, as is fully described above, and reduces the speed of the train from the fast speed designation of 30 miles per hour down to the slow speed designation for the train (7 miles per hour), because of the 75 code rate being applied to section S6. The train now continues until it enters the track section S7 in FIG. 1H, at which time a service application of the locomotive brakes is supplied, as is fully described above, due to the 37½ code rate in track section S7.

It is intended in the selected embodiment, that such service application of the locomotive brakes will be sufficient, under normal conditions, to stop the train short of track section S8, in FIG. 1J. However, if for some reason the train should advance onto track section S8, the STEADY code rate appearing in section S8 would cause magnet valve EMV, of FIG. 2B, to be deenergized as is fully discussed above, and would result in an emergency application of the locomotive brakes, to insure stopping of the train slot of wayside signal location 2R, in FIG. 1K. As previously mentioned, it is provided that such emergency brake application will require manual resetting before the train is allowed to proceed in the track layout; i.e., manual reset push button MR, of FIG. 2B, must be depressed to reenergize relay EMB and magnet valve EMV.

To further describe the operation of the selected embodiment of the present invention, it will now be assumed that the train has properly stopped on track section S7, short of section S8, and furthermore that conditions are now favorable for permitting this train to advance to the right with track switch RSW, of FIG. 1K, in its normal position. Obviously, such favorable conditions require that relay MRH, of FIG. 1L, be energized by a track code received from the right-hand end of track section RM2. It should be pointed out at this time that although the various circuit apparatus for track sections RS3 and RM2 are not illustrated, such circuit apparatus may be considered substantially the same as that illustrated for track sections S1 through S8 of FIGS. 1B through 1K. Thus, relays MRH and SRH are only energized when decoding transformers MDT and SDT are respectively supplied with interrupted inputs by the associated track relays; i.e. for example, track relay MRTR of FIG. 1L.

The control office now transmits a control for energizing the signal clearing relay GZ (not shown) associated with wayside signal location 2R and thus causes signal repeater relay 2RA–YGP, of FIG. 1K, to be energized. The steady energization of code repeater relay 1RCP is thus removed and this relay is now energized at a 180 code rate by a circuit extending from (+) in FIG. 1L, through back contact 13 of relay 1LGZ, front contact 14 of relay 1LAS, along wire 15 between FIGS. 1L and 1K, through front contact 117 of code oscillator 180CT, through front contact 118, back contact 17, front contact 18 and back contacts 19, 20, 21 and 22 of relays 2RA–YGP, 2RB–YP, R–OSTP, LFS, 8LH, 8LFP and RCFR respectively, and to (−). The right-hand end of track section S8 is now supplied with a 180 code rate which advances to the left in track section S8 and is received by track relay 1RTR, of FIG. 1J. This interrupted energization of track relay 1RTR, in addition to maintaining front repeater relay 1RFP in its energized position, now also causes energization of relay 1RH by means of decoding transformer DT1.

Referring now to FIG. 1J, a code repeater delay 2RCP is now energized at a 180 code rate by a circuit extending from (+), through movable contact 119 of track relay 1RTR (which is being energized at a 180 code rate), front contact 120 of relay 1RH, back contact 30 of relay 7LFP, and to (−). Thus, a 180 code rate is applied to the right-hand end of track section S7 and upon reception, at the locomotive, of such code, forward throttle is again applied on the locomotive, as is described above, and the train is allowed to proceed at its maximum speed of 30 miles per hours, over track sections S7 and S8.

As soon as the train advances onto track section RM1, in FIG. 1K, relays RM1T and R–OSTP, in FIGS. 1L and 1K respectively, are deenergized. Referring to FIG. 1K, this deenergization of relay R–OSTP opens the energizing circuit for code repeater relay 1RCP and thus removes any code from track section S8. With relay RM1T deenergized, relay RMRV, of FIG. 1L, is now energized by a circuit extending from (+), in FIG. 1L, through back contact 121 of relay RM1T, along wire 122 between FIGS. 1L and 1K, through front contact 123 of relay RNWC, along wire 124 between FIGS. 1K and 1L, through front contacts 125 and 126 of relays MRH and RS2T respectively, and to (−). The primary winding of transformer VT3 (see FIG. 1L) is now connected to the terminals of the A.C. voltage supply by a circuit extending from terminal BX, in FIG. 1K, through front contact 127 of code oscillator 180CT, front contact 128 of relay RNWC, along wire 129 between FIGS. 1K and 1L, through front contact 130 of relay RMRV, the primary winding of transformers VT3, and to terminal NX of the same A.C. voltage supply.

A 180 code rate is now applied to the right-hand end of track section RM1 via transformer VT3, rectifier VR3 and transformer VT4. This 180 code rate then advances to the left in track section RM1 and causes the approaching train to traverse track section RM1 at its maximum speed of 30 miles per hour. As soon as the train advances into track section RM2, in FIG. 1L, the train is then controlled by code rate which then exists in track section RM2.

When the tail end of the train now leaves track section RM1, relays RM1T and R–OSTP are returned to their normal energized positions as is fully described above. At this time, code repeater relay 1RCP, in FIG. 1K is once again steadily energized by the previously discussed circuit and the depicted coding condition of the accompanying drawings, is once again established. As mentioned previously, when relay 8RH, of FIG. 1B, becomes energized due to the coded energization of track relay 8RTR, the existing stick circuit for traffic stick relay RFS is now interrupted by the opening of back contact 116 of relay 8RH and the illustrated wayside circuits return to their assumed normal conditions.

In order to protect both track switches and trains against high speed running of the switches, it is provided, in the selected embodiment, to reduce the speed of the trains while they are travelling over a reversed track switch. To illustrate this, it will once again be assumed that a train has been stopped on track section S7 and now, that the control officer reverses track switch RSW, for moving the train onto the siding track of siding R.

The control office now energizes the signal clearing relay GZ, associated with wayside signal 2R, so as to clear signal 2RB for permitting the train to advance onto the siding track at siding R. Signal repeater relay 2RB–YP is subsequently energized and completes an energizing circuit for code repeater relay 1RCP which extends from (+) in FIG. 1L, through back contact 13 and front contact 14 of relays 1LGZ and 1LAS respectively, along wire 15 between FIGS. 1L and 1K, through front contacts 131 and 132 of code oscillator 120CT and relay 2RB–YP respectively, front contact 18 of relay R–OSTP, back contacts 19, 20, 21 and 22 of relays LFS, 8LH, 8LFP and RCFR respectively, and to (−). The steady code rate is thus removed from track section S8 and a 120 code rate is now applied to the right-hand end of section S8 and subsequently causes a 120 code rate be applied to the right-hand end of track section S7, in FIG. 1J. When this 120 code rate is received on the locomotive, forward throttle is then applied, as is fully described above, to start the train in motion. Referring to FIGS. 2A through 2C, it should be noted, however, that the train speed will now be controlled to 15 miles per hour, in accordance with the 120 code rate in track sections S7 and S8.

When the train advances onto track section RM1, relays RM1T and R–OSTP are once again deenergized and relay RMRV of FIG. 1L, is now energized by a circuit extending from (+) in FIG. 1L, through back contact 121 of relay RM1T, along wire 122 between FIGS. 1L and 1K, through front contact 133 of relay RRWC, along wire 134 between FIGS. 1K and 1L, through front contacts 135 and 126 of relays SRH and RS2T respectively, and to (−). It was previously pointed out that relay SRH is energized in response to the coding of siding track section RS3, and it should be further understood that this picking up of relay SRH is one of the conditions that would be met, before a train is permitted to enter the siding track of siding R, over switch RSW reversed.

A 120 code rate is now applied to the right-hand end of track section RM1 by transformer VT3, of FIG. 1L, since the primary winding of this transformer VT3 is now connected to the terminals of the A.C. voltage supply by the circuit extending from terminal BX of FIG. 1K, front contact 136 of code oscillator 120CT, back contact 137 of relay RNWC, along wire 129 between FIGS. 1K and 1L, through front contact 130 of relay RMRV, and to terminal NX through the primary winding of transformer VT3. This 120 code rate is then effective, because of crossbond CBR, of FIG. 1K, and the other conventional switch crossbonds (not shown), to cause the train to traverse the left-hand portion of track section RM1 and siding section RS1 at a medium speed of 15 miles per hour, instead of a maximum speed which, it is assumed, could possibly cause damage to track switch RSW and also possible derailment of the train. When the train now advances onto siding track section RS2, track relay RS2T, FIG. 1L, is now deenergized.

Referring now to FIGS. 1K and 1L of the accompanying drawings, it is intended, in the illustrated embodiment, that relays RMLV, RSLV, RMRV and RSRV (as well as the corresponding relays of FIGS. 1A and 1B) be of the quick pick-up type. Therefore, relay RSRV of FIG. 1L, is now energized by a circuit extending from (+) in FIG. 1L, through back contact 138 of track relay RS2T, front contacts 139 and 140 of relays SRH and RMRV respectively, and to (−). Obviously, the pick up time of relay RSRV must be less than the release time for relay RMRV since the dropping away of relay RS2T opens the above described energizing circuit for relay RMRV at front contact 126 of relay RS2T. Once relay RSRV is picked up, a stick circuit, including front contact 141 is completed which maintains relay RSRV energized even though relay RMRV is subsequently dropped away.

A 120 code rate is now applied to the right-hand end of sliding track section RS2, since the primary winding of transformer VT5, of FIG. 1L, is now energized at a 120 code rate by a circuit extending from terminal BX in FIG. 1K, through front contact 136 of code transmitter 120CT, through back contact 137 of relay RNWC, along wire 129 between FIGS. 1K and 1L through back contact 142 of relay RMRV, front contact 143 of relay RSRV, the primary winding of transformer VT5, and to terminal NX of the A.C. voltage supply. While on siding track section RS2, the train then proceeds at the medium speed of 15 miles per hour.

As soon as the train clears siding track section RS2, relays RS2T and R–OSTP are once again energized, and, as stated previously for the main line move past track switch RSW, the depicted coding condition is once again established.

In order to further explain the operation of the selected embodiment, it will now be assumed that a train is approaching signal 1LB, from the right on the siding track of siding R and furthermore that the control office wishes to advance this train up to signal 2L, in FIG. 1B with signal 2L in its normal "stop" condition. Initially, track switch RSW will be actuated to its reverse position and signal clearing relay 1LGZ, of FIG. 1L will be energized as was fully explained for signal clear relay 1RGZ of FIG. 1A.

Code repeater relay 1RCP of FIG. 1K, is now deenergized due to the opening of back contact 13 of relay 1LGZ (see FIG. 1L) and the illustrated code rates are now removed from track sections S1 through S8. Thus, with relays 8RH and 8RFP of FIG. 1B, now deenergized, code repeater relay 1LCP of FIG. 1B, is consequently steadily energized by a circuit extending from (+) in FIG. 1A, through back contact 144 of relay 1RGZ, front contact 145 of relay 1RAS, along wire 146 between FIGS. 1A and 1B, through back contacts 147 and 148 of signal repeated relays 2LA–YGP and 2LB–YP respectively, front contact 149 of relay L–OSTP, back contacts 150, 61, 62 and 73 of relays RFS, 8RH, 8RFP and LCFR respectively, and to (−). The left-hand end of track section S1 is thus supplied with a STEADY code rate in exactly the same manner as the illustrated STEADY code rate was supplied to track section S8. In a manner similar to that previously discussed, the illustrated circuits then respond to this STEADY code rate in section S1 and set up various code rates in the remaining track sections S2 through S8 until a coding condition exists which is exactly opposite to that illustrated in the accompanying drawings; i.e. section S1 is supplied with a STEADY code rate, section S2 a 37½ code rate, section S3 a 75 code rate, sections S4 and S5 a 180 code rate, and finally sections S6, S7 and S8 with a 120 code rate.

The reception of the 120 code rate in track section S8, by relay 8LTR (see FIG. 1K), causes relays 8LFP and 8LH to become steadily energized, as was discussed above, and traffic stick relay LFS is now energized by a circuit extending from (+) in FIG. 1L, through front contact 151 of signal clear relay 1LGZ, along wire 152 between FIGS. 1L and 1K, through front contact 153 of relay 8LH, and to (−). The code rate appearing in track sections S6, S7 and S8 is now changed from a 120 code rate to a 180 code rate, due to the subsequent energization of relay RNWCP, of FIG. 1G, by a circuit extending from (+) in FIG. 1K, through front contact 154 of relay R–OSTP, front contact 155 of traffic stick relay LFS, along wire 81 between FIGS. 1K and 1J, through back contact 156 of relay 1RFP, along wire 78 between FIGS. 1J and 1H, through back contact 157 of relay 2RFP, along wire 75 between FIGS. 1H and 1G, through back contact 158 of relay 3RFP, the winding of relay RNWCP, the lower back contact 158 of relay 3RFP, and back to (−) in FIG. 1K, via the lower wires 75, 78 and 81 in FIGS. 1G through 1K, and front contact 155 of relay LFS. In addition, signal 1LB, of FIG. 1L is now cleared to its green aspect, by a circuit extending from (+) in FIG. 1L, through front contact 159 of relay 1LGZ, along wire 160 between FIGS. 1L and 1K, through front contacts 161, 162, 163 and 164 of relays R–OSTP, LFS, 8LH and 8LFP respectively, through back contact 165 of relay RNWC, front contact 166 of relay RRWC, along wire 167 between FIGS. 1K and 1L, through operating coil OC4 of signal 1LB, and to (−). At this time, a 120 code rate is supplied to the left-hand end of siding track section RS3 which allows the approaching train to traverse section RS3 at its medium speed. Although no circuits are illustrated for application of such code rate to siding track section RS3, it should be understood that such circuits would be substantially similar to those depicted in FIGS. 1L and 1A for applying code rates to the left and right-hand ends of track sections RM2 and LM2 respective, except that the train speed, in the present case, would be limited to the medium speed designation for the train.

When the train advances onto track section RS2, so as to deenergize relays RS2T and R–OSTP, relay RNWCP of FIG. 1G, is now deenergized, by the opening of front contact 154 of relay R–OSTP, and causes a 120 code to once again be applied to track sections S6, S7 and S8 for reasons previously set forth. This dropping away of a relay RS2T also causes energization of relay RSLV of FIG. 1L, by a circuit extending from (+) in FIG. 1L, through back contact 138 of relay RS2T, front contact 168 of relay RM1T, along wire 169 between FIGS. 1L and 1K, through front contacts 170 and 171 of relays RRWC and 8LH respectively, along wire 172 between FIGS. 1K and 1L, and to (−).

A 120 code rate is now applied to the left-hand end of siding track section RS2 (see FIG. 1K) due to the completion of the energizing circuit for the primary winding of transformer VT6 in FIG. 1L, which extends from terminal BX in FIG. 1K, through front contact 136 of code transmitter 120CT, back contact 137 of relay RNWC, through back contact 173 of relay RMLV, along wire 174 between FIGS. 1K and 1L through front contact 175 of relay RSLV, and to terminal NX of the same A.C. voltage supply. It will be noted in FIGS. 1L and 1K that this 120 code rate is applied to siding track section RS2 via wires 176 between FIGS. 1L and 1K. The reception of this 120 code rate, on the locomotive, now causes the train to continue at 15 miles per hour.

As soon as the train enters siding track section RS1, track relay RM1T of FIG. 1L, is deenergized and thus completes an energizing circuit, for relay RMLV of FIG. 1K, which extends from (+) in FIG. 1L, through back contact 121 of track relay RM1T, along wire 122 between FIGS. 1L and 1K, through front contact 177 of relay RRWC, along wire 178 between FIGS. 1K and 1L, through front contact 179 of relay RSLV, along wire 180 between FIGS. 1L and 1K, through front contact 181 of relay 8LH, and to (—). Since the dropping away of track relay RM1T also opens the energizing circuit for relay RSLV (to remove code from track section RS2), it is apparent that relay RMLV should be quick pick up in nature, as was pointed out hereinbefore. A 120 code rate is applied to the left-hand end of track section RM1 (via transformer VT7 and rectifier VR7), upon closure of front contact 182 of relay RMLV, to insure that the train will traverse track switch RSW at medium speed.

When the head end of the train now advances into track section S8, it receives the 120 code rate appearing in this track section S8 and continues at a medium speed until its tail end leaves track section RM1, at which time relays RM1T and R–OSTP are once again energized. This picking up of relay R–OSTP, once more completes the above described energizing circuit for relay RNWCP of FIG. 1G, so that 180 code rate is once more applied to track sections S6 through S8. The train may now resume its maximum speed of 30 miles per hour up to approach signal LAA in FIG. 1E, where its speed is then reduced to slow and the train is eventually stopped in track section S2 in exactly the same manner as was previously discussed for a move to the right along track sections S1 through S8.

From the above, it is seen that provisions have been made for reducing train speeds over reversed track switches by supplying those track sections surrounding the switch with code rates indicative of reduced train speeds. Extending this idea, it should be obvious that similar control could also be provided for at curves, hills, etc. by simply applying track code rates indicative of safe train speeds in those track sections forming the hill, curve, etc., as well as any other adjacent sections according to the requirements of practice. For example, if a curve is to be round at medium speed, utilizing the assumed code rates, a 120 track code rate would be transmitted from the exit side of the curve towards an approaching railway train to reduce the speed of the train while rounding the curve. It should therefore be understood at this time that such speed control at curves, hills, etc. could easily be provided, if desired, without in any manner departing from the spirit or scope of the present invention.

Having described a railroad remote control system, as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What we claim is:

1. A control system for controlling the operation of railway vehicles in two directions on a single track railroad having a stretch of single track extending between two passing sidings, the railway tracks of each of said passing sidings converging through a track switch to one end of said stretch of track and including track sections thereof forming a detector track circuit adjoining the associated end of said stretch of track for said track switch comprising, in combination, control means for providing track switch control at each end of said stretch of single track and for designating these ends of said stretch of track as respective entrance and exit ends in accordance with the desired direction of traffic on said stretch of track, detecting means at the exit end for detecting the existing track and traffic conditions in advance of said exit end along the designated routes for said vehicles, transmitting means at said exit end for transmitting track code information in the track rails toward said entrance end distinctive of the desired vehicle performance on said stretch of single track in accordance with the condition of said detecting means, means responsive to the track code information transmitted from the exit end of said stretch of single track for controlling the entrance of railway vehicles into that detector track circuit adjoining the entrance end of said stretch of track, coding means for each of said detector track circuits for transmitting track code information in each of said detector track circuits distinctive of the desired performance of railway vehicles on said detector track circuits, and means on said railway vehicles responsive to track code information for selectively operating the brake and throttle mechanisms of vehicles on said detector track circuits and said stretch of single track in accordance with the distinctiveness of the respective track code information transmitted in said detector track circuits and said stretch of single track.

2. A control system as specified in claim 1 wherein the track code information transmitted by the coding means associated with each of said detector track circuits is dependent upon the position of the track switch associated with that detector track circuits.

3. A control system as specified in claim 1 wherein track code transmission continues in said stretch of single track from that end thereof last designated as the exit end until the ends of said stretch of single track are oppositely designated.

4. In a control system for controlling the operation of railway vehicles in track layout formed by a plurality of railway tracks interconnected by a switching area whereby a plurality of routes may be established through said track layout, the combination of, control means for positioning the track switches of said switching area in accordance with the desired routing of each railway vehicle through the track layout, transmitting means responsive to the positioning of said track switches by said control means for transmitting track code information in substantially the entire length of track rails to be traveled by said railway vehicles in traversing their respective routes through said track layout distinctive of the desired performance of said vehicles in traversing their respective routes, and means on said railway vehicles responsive to track code information and to the actual vehicle performance along said desired routes for selectively operating the brake and throttle mechanisms of said vehicles along the respective routes for the vehicles so as to cause conformity between actual vehicles performance and the desired vehicle performance called for by the track code information transmitted in the track rails to be travelled by said vehicles in traversing their respective routes.

5. A control system as specified in claim 4 wherein the distinctive track code information transmitted in the track rails to be travelled by said vehicles in traversing their respective routes is transmitted in the opposite direction to that taken by the vehicles in traversing their respective routes.

6. A control system for controlling the operation of a railway vehicle through a track switching area comprising, in combination, control means for positioning the track switches of said track switching area in accordance with the desired routing of said railway vehicle through said switching area, detector means responsive to the positioning of said track switches for detecting the existing track and traffic conditions along said desired route, transmitting means responsive to the condition of said detecting means for transmitting track code information in substantially the entire length of track rail to be travelled by said railway vehicle in traversing said desired route distinctive of the desired performance of said vehicle along said desired route, and means on said vehicle responsive to said track code information and to the actual vehicle performance along said desired routes for selectively operating the brake and throttle mechanisms of said vehicle so as to cause conformity between actual vehicle performance and the desired vehicle performance called for by the track code information transmitted in the track rails to be travelled by said vehicle in traversing said desired route.

7. In a control system for controlling the operation of railway vehicles in two directions over a stretch of single track having a track switch at each of its ends for connecting said stretch of track between two passing sidings, the combination of, control means for operating said track switches in accordance with the designated routes for said vehicles and for designating one end of said stretch of track as the exit end and the opposite end of said stretch of track as the entrance end in accordance with the desired direction of traffic on said stretch of single track, detecting means at said exit end responsive to the position of the associated track switch for detecting the traffic conditions existing in advance of said exit end along the designated routes for said vehicles, transmitting means at said exit end for transmitting track code information in the track rails toward said entrance end distinctive of the desired vehicle performance on said stretch of track in accordance with the condition of said detecting means, and means on said railway vehicles responsive to the track code information transmitted from said exit end for selectively operating the brake and throttle mechanisms of said vehicles in accordance with the distinctiveness of said transmitted track code information.

8. In a control system for controlling the operation of railway vehicles in two directions over a stretch of single track having a track switch at each of its ends for connecting said stretch of track between two passing sidings, the combination of, control means for operating said track switches in accordance with the designated routes for said vehicles and for designating one end of said stretch of track as the exit end and the opposite end of said stretch of track as the entrance end in accordance with the desired direction of traffic on said stretch of single track, detecting means at said exit end responsive to the position of the associated track switch for detecting the traffic conditions existing in advance of said exit end along the designated routes for said vehicles, transmitting means at said exit end for transmitting track code information in the track rails toward said entrance end distinctive of the desired vehicle performance on said stretch of track in accordance with the condition of said detecting means, entrance control means at said entrance end responsive to the track code information transmitted from said exit end for controlling the entrance of railway vehicles at said entrance end, and means on said railway vehicles responsive to the track code information transmitted from said exit end for selectively operating the brake and throttle mechanisms of said vehicles in accordance with the distinctivness of said transmitted track code information.

9. A control system for controlling the operation of railway vehicles at a track switch connecting a single track to a plurality of diverging routes comprising, control means for selectively positioning said track switch in accordance with the designated routes for said vehicles from said single track, detecting means responsive to the position of said track switch for detecting the traffic conditions existing in advance of said single track along the designated routes for said vehicles, transmitting means for transmitting track code information toward said vehicles in the track rails adjacent said track switch and the track rails of said single track distinctive of the desired performance of said vehicles while traversing said track rails in accordance with the condition of said detecting means, and vehicle carried means responsive to the track code, information transmitted by said transmitting means for selectively operating the brake and throttle mechanisms of said vehicles in accordance with the distinctiveness of said transmitted track code information.

10. In a system for controlling a railway vehicle in a track layout including a track switch, the combination of, a detector track section surrounding said track switch including means for registering the presence of said vehicle adjacent said track switch, coding means responsive to the positioning of said track switch and the desired direction of travel of said vehicle over said track switch for transmitting coded information throughout the portion of said detector track section to be travelled by said vehicle distinctive of the desired operation of said vehicle on said detector track section, and means carried on said vehicle responsive to said transmitted coded information for providing a registration of said desired vehicle operation.

11. The system specified in claim 10 including control apparatus on said vehicle responsive to the registration provided by said vehicle carried registering means for operating the throttle and brake mechanisms of said vehicle as required to cause said vehicle to operate as desired.

12. The system specified in claim 10 wherein said coding means are rendered effective to transmit said coded information upon registration by the detector track section registering means that said vehicle is adjacent said track switch.

13. In a system for controlling a railway vehicle in a track layout including a track switch, the combination of, a detector track circuit surrounding said track switch for registering the presence of said vehicle adjacent said track switch, coding means responsive to the position of said track switch and the desired direction of travel of said vehicle over said track switch for transmitting coded information in the track rail portion of said detector track circuit to be travelled over by said vehicle distinctive of the desired operation of said vehicle on said detector track circuit, and means carried on said vehicle responsive to said transmitted coded information for providing a registration of said desired vehicle operation.

14. In a system for controlling a railway vehicle in a track layout including a track switch connecting a single track to a plurality of diverging routes, the combination of, switch controlled means for selectively positioning said track switch in accordance with the desired routing of said vehicle over said track switch from said single track, a detector track section surrounding said track switch and including a portion of said single track and a portion of each of said diverging routes, detecting means responsive to the desired routing of said vehicle for detecting advance traffic conditions along said desired vehicle route, means responsive to said detecting means for transmitting coded information throughout the portion of said detector track section to be travelled by said vehicle distinctive of the desired operation of said vehicle along said desired route, and means carried on said vehicle responsive to said transmitted information for providing on said vehicle a registration of said desired vehicle operation.

15. The system specified in claim 14 including control apparatus on said vehicle responsive to the registration provided by said vehicle carried registering means for operating the throttle and brake mechanisms of said vehicle as required to cause said vehicle to operate as desired.

16. In a system for controlling a railway vehicle in a track layout including a track switch connecting a single track to a plurality of diverging routes, the combination of, switch control means for selectively positioning said track switch in accordance with the desired routing of said vehicle over said track switch from said single track, a detector track circuit surrounding said track switch and including the rails of said single track and the rails of each of said diverging routes, detecting means responsive to the desired routing of said vehicle for detecting advance traffic conditions along said desired vehicle route, means responsive to said detecting means for transmitting coded information in the track rail portion of said detector track circuit to be travelled by said vehicle distinctive of the desired operation of said vehicle along said desired route, and means carried on said vehicle responsive to said transmitted coded information for providing on said vehicle a registration of desired vehicle operation.

17. In a system for controlling a vehicle equipped with brakes along a stretch of right of way including a section thereof within which the vehicle is desired to stop, first brake control means rendered effective upon entrance of the vehicle into the desired stopping section to cause a first predetermined degree of application of the vehicle brakes intended to stop the vehicle within the desired stopping section, detecting means to determine if the train overruns the desired stopping location, and second brake control means rendered effective in response to the detecting means if the vehicle fails to stop within the desired stopping section for causing a second predetermined degree of application of the vehicle brakes.

18. The combination specified in claim 17 wherein the vehicle is equipped with control means for automatically operating the brakes of the vehicle in accordance with command information supplied thereto remotely, and wherein the vehicle brakes can be automatically released by the control means provided the brakes have not been applied by the second brake control means.

19. The combination specified in claim 18 including means effective only when manually operated for releasing application of the brakes by the second brake control means.

20. In a system for controlling a railway vehicle equipped with throttle and brakes on a stretch of track divided into a plurality of sections and including one section wherein the vehicle is desired to stop, first transmitting means for transmitting command information in the rails of the track sections in approach of the desired stopping section indicative of the desired speed of the vehicle when approaching the desired stopping section, second transmitting means for transmitting command information in the rails of the desired stopping section distinctive of a desired first predetermined degree of application of vehicle brakes intended to stop the vehicle within the desired stopping section, third transmitting means for transmitting command information in the rails of the first track section beyond the desired stopping track section distinctive of a desired second predetermined degree of application of the vehicle brakes, and means on the vehicle responsive to transmitted command information for selectively and automatically operating throttle and brake mechanisms of the vehicle to cause vehicle operation of said track sections as called for by the command information transmitted in the track sections.

21. In a system for controlling a vehicle on a right of way having a location at which it is desired that the vehicle should stop, control means for the vehicle responsive to command information supplied thereto distinctive of the desired operation of the vehicle on the right of way for causing automated operation of the vehicle through selective application of power and brakes respectively to cause the vehicle to proceed at remotely designated command speeds and to stop and start as commanded, wayside control means for conveying to the vehicle a distinctive command for a first degree of application of the brakes of the vehicle sufficient to bring the vehicle to a stop, detecting means for detecting whether or not the braking of the vehicle according to a command to stop has been rendered effective, and means controlled by the detecting means for effecting a second degree of application of the brakes of the vehicle when it is detected that the application of the brakes by the first braking means has not been effective to stop the vehicle according to a stop command.

22. The invention according to claim 21 wherein the automated control of the vehicle is rendered ineffective in response to the rendering effective of the application of the second degree of braking.

References Cited by the Examiner

UNITED STATES PATENTS

| | | | |
|---|---|---|---|
| 2,315,038 | 3/1943 | Baughman | 246—22 |
| 2,447,669 | 8/1948 | Riley | 104—149 |
| 2,681,984 | 6/1954 | Van Tassel | 246—63 X |
| 2,700,727 | 1/1955 | Judge et al. | 246—26 |
| 2,826,685 | 3/1958 | Luft | 246—63 X |
| 2,915,623 | 12/1959 | Hughson | 246—182 |
| 2,948,234 | 8/1960 | Hughson | 104—26 |
| 2,951,452 | 9/1960 | Karlet | 104—26 |
| 3,079,495 | 2/1963 | Ferm et al. | 246—33 |
| 3,140,068 | 7/1964 | Matthews | 246—167 |

ARTHUR L. LA POINT, Primary Examiner.

S. B. GREEN, Assistant Examiner.